US008364424B2

(12) United States Patent
Lou et al.

(10) Patent No.: US 8,364,424 B2
(45) Date of Patent: Jan. 29, 2013

(54) SYSTEM AND METHOD FOR MONITORING A WIND TURBINE GEARBOX

(75) Inventors: Huageng Lou, Clifton Park, NY (US); Darren Lee Hallman, Scotia, NY (US); Robert Arvin Hedeen, Clifton Park, NY (US); Michael Sirak, Erie, PA (US); Dennis Richter, Lawrence Park, PA (US)

(73) Assignee: General Electric Company, Niskayuna, NY (US)

( * ) Notice: Subject to any disclaimer, the term of this patent is extended or adjusted under 35 U.S.C. 154(b) by 312 days.

(21) Appl. No.: 12/847,331

(22) Filed: Jul. 30, 2010

(65) Prior Publication Data

US 2012/0029838 A1 Feb. 2, 2012

(51) Int. Cl.
G06F 19/00 (2011.01)

(52) U.S. Cl. ......................................................... 702/34
(58) Field of Classification Search .................... 702/34, 702/56; 416/61; 700/90; 73/593
See application file for complete search history.

(56) References Cited

U.S. PATENT DOCUMENTS

| 5,602,757 | A | 2/1997 | Haseley et al. | |
|---|---|---|---|---|
| 7,013,210 | B2 | 3/2006 | McBrien et al. | |
| 7,191,073 | B2 | 3/2007 | Astley et al. | |
| 7,912,659 | B2 * | 3/2011 | Luo | 702/56 |
| 7,930,111 | B2 * | 4/2011 | Luo et al. | 702/34 |
| 2005/0096873 | A1 | 5/2005 | Klein | |
| 2005/0284225 | A1 | 12/2005 | Luo | |
| 2008/0069693 | A1 | 3/2008 | Malakhova et al. | |
| 2008/0140349 | A1 | 6/2008 | Behera et al. | |
| 2009/0093975 | A1 | 4/2009 | Judd et al. | |
| 2009/0266160 | A1 * | 10/2009 | Jeffrey et al. | 73/455 |
| 2010/0071469 | A1 | 3/2010 | Luo et al. | |
| 2011/0020122 | A1 * | 1/2011 | Parthasarathy et al. | 416/61 |

FOREIGN PATENT DOCUMENTS

WO 2009133161 A2 11/2009

OTHER PUBLICATIONS

Search Report from corresponding PCT Application No. PCT/US2011/044316 dated Aug. 16, 2012.

* cited by examiner

*Primary Examiner* — Bryan Bui
(74) *Attorney, Agent, or Firm* — Joseph J. Christian

(57) ABSTRACT

A system and method are provided to monitor the health of a wind turbine gearbox. The system includes a plurality of sensors coupled to the wind turbine gearbox and a controller coupled to the plurality of sensors. The controller is configured to acquire vibration information from a vibration sensor, acquire a tachometer signal, convert the tachometer signal and the vibration information into a cycle domain signal, and perform an order analysis on the cycle domain signal, the order analysis providing information that identifies potential and actual damage within the wind turbine gearbox.

17 Claims, 17 Drawing Sheets

SYSTEM AND METHOD FOR MONITORING A WIND TURBINE GEARBOX

BACKGROUND OF THE INVENTION

Wind power is one of the fastest growing energy sources around the world. The long-term economic competitiveness of wind power as compared to other energy production technologies is closely related to the reliability and maintenance costs associated with the wind turbine. The wind turbine gearbox is generally the most expensive component to purchase, maintain, and repair.

The conventional vibration monitoring system is based on features uniquely associated with the gearbox bearing design, the gearbox gear design, and the gearbox shaft rotational speeds. For example, in a 1.5 MW wind turbine the speed of a main rotor is amplified approximately two orders of magnitude by a multi-stage gearbox before driving a generator. Thus, the gear and bearing damage signatures are high orders (not necessarily an integral order) of the main shaft rotational frequency. Moreover, in operation, the main shaft speed is not precisely controlled. Therefore, the rotational speed of the main shaft varies based on the wind conditions and the generator loading. A small variation in the main shaft speed may cause significant variations in the bearing and gear vibration feature frequencies, especially the frequencies associated with the high-speed shaft. As a result, the conventional vibration monitoring system may be less effective in providing reliable information under all operating conditions.

BRIEF DESCRIPTION OF THE INVENTION

A system and method are provided to monitor the health of a wind turbine gearbox. The system includes a plurality of sensors coupled to the wind turbine gearbox and a controller coupled to the plurality of sensors. The controller is configured to acquire vibration information from a vibration sensor, acquire a tachometer signal, convert the tachometer signal and the vibration information into a cycle domain signal, and perform an order analysis on the cycle domain signal, the order analysis providing information that identifies potential and actual damage within the wind turbine gearbox.

DETAILED DESCRIPTION OF THE INVENTION

Figure 1:
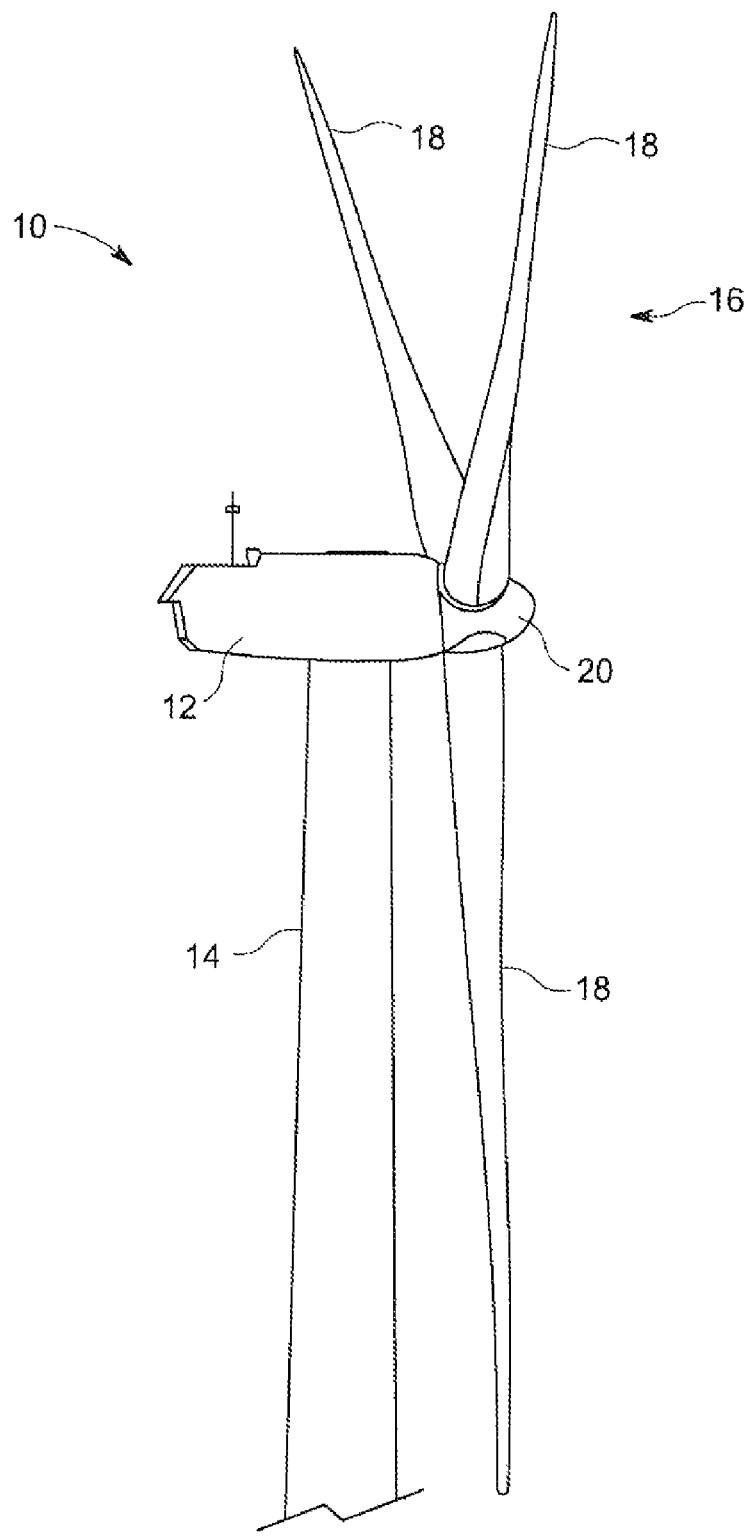
FIG. 1 is a pictorial view of an exemplary configuration of a wind turbine in accordance with various embodiments.

Embodiments of the invention will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments described herein provide a health monitoring system and method that may be utilized to monitor the health of a wind turbine gearbox. By practicing at least one embodiment, and at least one technical effect of various embodiments, the health monitoring system and method enable personnel to monitor the health of the wind turbine gearbox. Specifically, the health monitoring system acquires health information that enables an operator to identify potential or current damage of a variety of components installed in the wind turbine gearbox. Embodiments of the system and method also enable an operator to identify the extent of the damage and to modify the operation of the wind turbine gearbox to extend the operational life of the wind turbine gearbox until repairs may be accomplished. Additionally, embodiments of the system and method enable the operator to ascertain the progression of damage to a component within the wind turbine gearbox and modify the operation of the wind turbine gearbox to based on the extension of the damage.

FIG. 1 is a pictorial view of an exemplary configuration of a wind turbine 10 in accordance with various embodiments. The wind turbine 10 includes a nacelle 12 housing a generator. The nacelle 12 is mounted atop a tower 14, only a portion of which is shown in FIG. 1. The height of the tower 14 is selected based upon various factors and conditions to optimize the operational performance of the wind turbine 10. The wind turbine 10 also includes a rotor 16 that includes a plurality of rotor blades 18 that are attached to a rotating hub 20. Although the wind turbine 10 illustrated in FIG. 1 is shown as including three rotor blades 18, it should be realized that the wind turbine 10 may include more than three rotor blades 18 and there are no specific limits on the number of rotor blades 18 that may be installed on the wind turbine 10.

Figure 2:
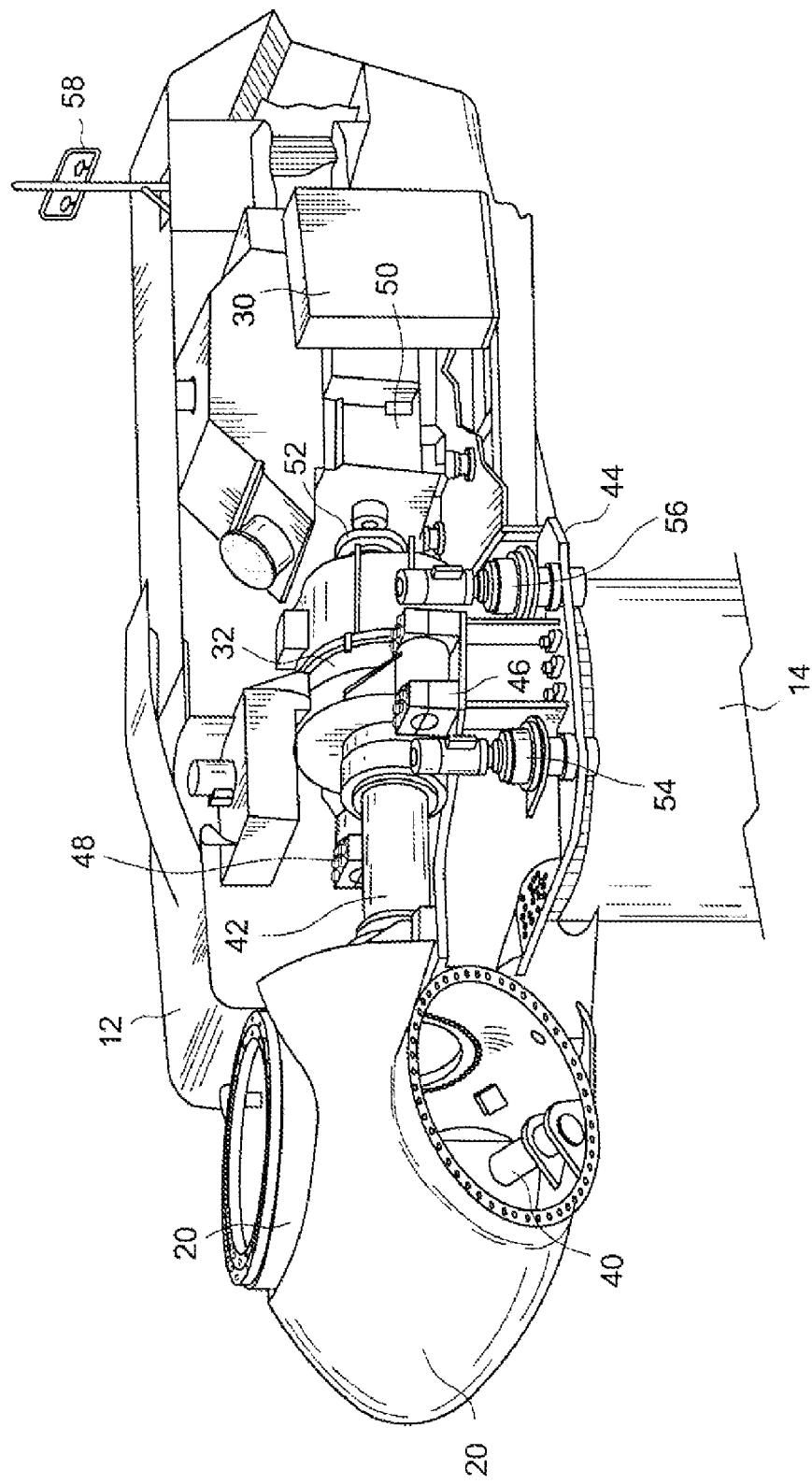
FIG. 2 is a cut-away perspective view of the nacelle of the exemplary wind turbine configuration shown in FIG. 1.

FIG. 2 is a cut-away perspective view of the nacelle 12 shown in FIG. 1. In the exemplary embodiment, the nacelle 12 includes a controller 30 that is configured to perform health monitoring of a gearbox 32 installed in the nacelle 12. In some embodiments, the controller 30 may also be configured to perform overall system monitoring and control, including pitch and speed regulation, high-speed shaft and yaw brake application, yaw and pump motor application and fault monitoring.

For example, the controller may provide control signals to a variable blade pitch drive unit 40 to control the pitch of the rotor blades 18 (shown in FIG. 1) that drive the rotating hub 20 as a result of wind. In some embodiments, the pitch of the rotor blades 18 are individually controlled using the blade pitch drive unit 40. The drive train of the wind turbine 10 includes a main rotor shaft 42, also referred to as a "low speed shaft". The main rotor shaft 42 is connected to the rotating hub 20 and the gearbox 32 to drive a high-speed shaft enclosed within the gearbox 32. The configuration of the gearbox 32 is discussed in more detail below. The gearbox 32, in some embodiments, is secured to a stationary frame 44 utilizing a pair of torque arms 46 and 48. In operation, the rotation of the rotating hub 20 causes a torque to occur on the main rotor shaft 42 causing the main rotor shaft 42 to rotate. Torque is a pseudo-vector corresponding to the tendency of a force to rotate an object about some axis, e.g., to rotate the main rotor shaft 42 around a central rotational axis. The pair of torque arms 46 and 48 facilitate connecting the center of the rotational axis of the main rotor shaft 42 to a point where the force is applied, in this example, to the stationary frame 44. Accordingly, rotor torque is transmitted via the main rotor shaft 42 to the gearbox 32. The torque is then transmitted from the gearbox 32 to a generator 50, via a coupling 52. The generator 50 may be of any suitable type, for example, a wound rotor induction generator.

A yaw drive 54 and a yaw deck 56 provide a yaw orientation system for the wind turbine 10. In some embodiments, the yaw orientation system is electrically operated and controlled by the controller utilizing information received from various sensors installed on the wind turbine 10. The wind turbine 10 may also include a wind vane 58 as a back-up or a redundant system for providing information for the yaw orientation system.

Figure 3:
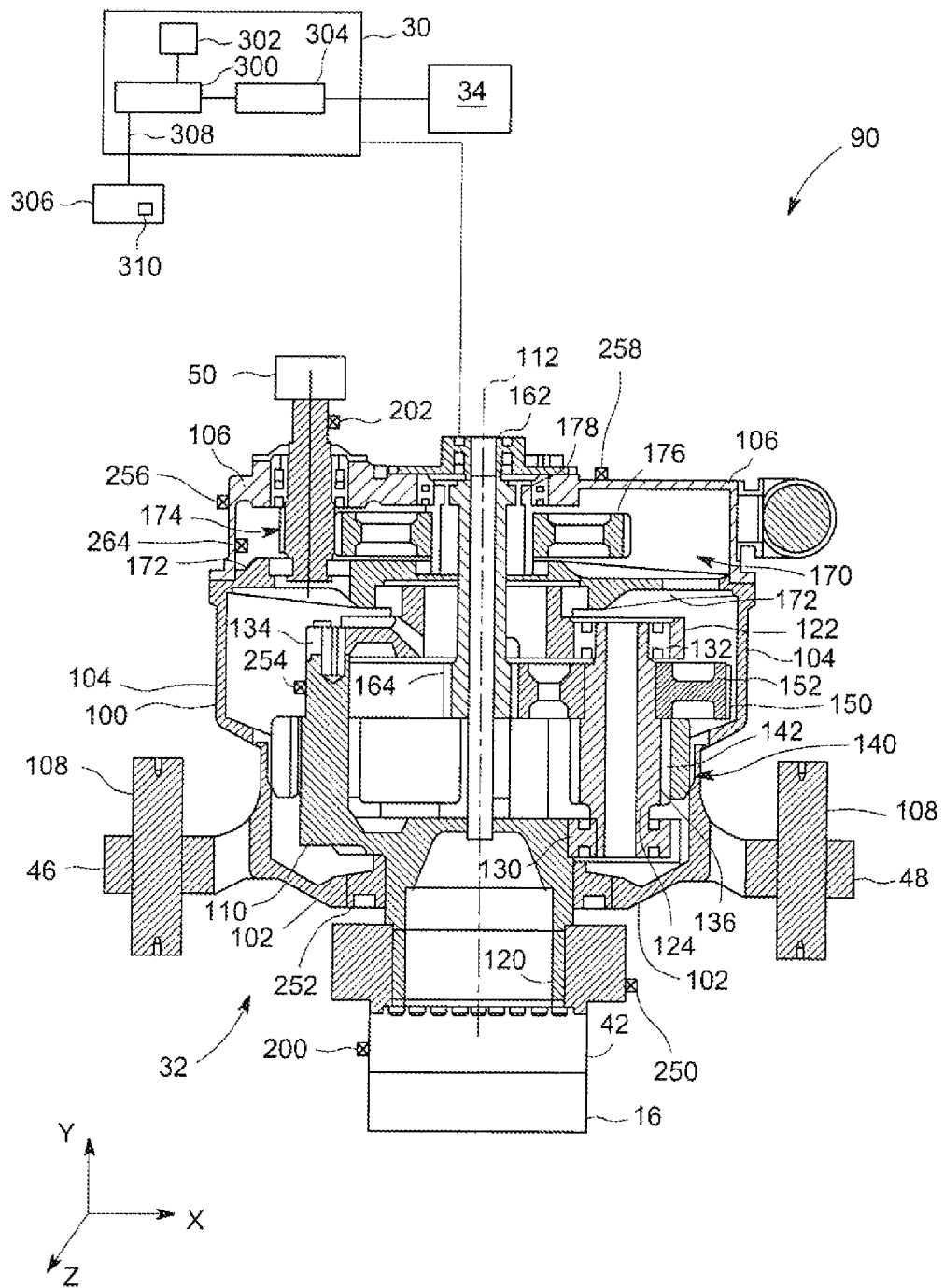
FIG. 3 is a simplified schematic illustration of an exemplary system that may be utilized with the wind turbine shown in FIGS. 1 and 2 in accordance with various embodiments.

FIG. 3 is a simplified schematic illustration of an exemplary system 90 that may be utilized to perform wind turbine gearbox health condition monitoring assessment of an exemplary wind turbine gearbox, such as gearbox 32 shown in FIG. 2. A cross-sectional view of the gearbox 32 is shown in FIG. 3. In the exemplary embodiment, the system 90 is coupled to the wind turbine gearbox 32. As discussed above, the gearbox 32 is preferably coupled between the rotor 16 and the generator 50. During operation, wind causes the rotor 16 to rotate. The rotational force of the rotor 16 is transmitted, via the gearbox 32, to the generator 50, which includes a generator rotor (not shown). The generator rotor typically operates at a rotational speed that is greater than a rotational speed of the rotor 16. Thus, during normal operation, the gearbox 32 is configured to increase the speed of rotation produced by the rotor 16 to the more desirable speed for driving the rotor of the generator 50.

In the exemplary embodiment, the gearbox 32 includes a gearbox housing 100, which includes an input end cover 102, a planet gear cover 104, and a final stage cover 106. The gearbox housing 100 is supported on the nacelle 12 by a pair of support pins 108. The input end cover 102 of the gearbox housing 100 extends around and supports a planet carrier 110, for rotation of the planet carrier 110 relative to the housing 100 about a central axis 112 of the planet carrier 110. An input hub 120 on a first end of the planet carrier 110 is coupled to the main rotor shaft 42, in a suitable manner, not shown, for rotation with the rotor 16. The input hub 120 receives rotational force from the rotor 16 and rotates the planet carrier 110 relative to the gearbox housing 100 in response to that rotational force. The second end of the planet carrier 110, as illustrated, is substantially open, with a detachably mounted end plate 122 attached to the second end of the planet carrier 110. This removable carrier end plate 122 acts as a planet bearing support, as explained below.

The planet carrier 110 supports a plurality of planet pinions 124 therein for orbital movement about the central axis 112. In the illustrated embodiment, three planet pinions 124 are provided, spaced apart equally about the central axis 112. Bearings support the planet pinions 124 for rotation relative to the planet carrier 110. Specifically, a first planet bearing 130, mounted at the first end of the planet carrier 110, engages and supports a first end of each planet pinion 124, supporting that end of the planet pinion 124 directly from the planet carrier 110. A second planet bearing 132, which is mounted on a planet carrier end plate 134 engages and supports a second end of each planet pinion 124, thereby supporting the second end of the planet pinion 124 indirectly from the planet carrier 110. Each one of the planet pinions 124 has a plurality of external gear teeth 136 which, in the illustrated embodiment, are spur gear teeth.

The gearbox 32 also includes a ring gear 140. The ring gear 140 is substantially fixed relative to the interior of the gearbox housing 100. That is, the ring gear 140 has external splines that mate with splines on the interior of the housing 100, preventing the ring gear 140 from rotating relative to the housing 100. The ring gear 140 basically floats relative to the housing 100, in that the ring gear 140 can move radially a slight amount, within the clearance between the external splines on the ring gear 140 and the internal splines on the housing 100. The planet pinions 124 are substantially smaller in diameter than the ring gear 140.

The ring gear 140 has an array of internal spur or helical gear teeth 142. The internal gear teeth 142 on the ring gear 140 are in meshing engagement with the external gear teeth 136 on the planet pinions 124. As a result, orbital movement of the planet pinions 124 about the central axis 112, in response to rotation of the input hub 120 and the planet carrier 110 about the central axis 112, causes the planet pinions 124 to rotate about their own axes relative to the planet carrier 110. The rotational force transmitted from the rotor 16 to the input hub 120 is thus transmitted entirely to the planet pinions 124 to drive the planet pinions 124 to rotate about their own axes.

The gearbox 32 also includes a plurality of planet gears 150. The number of planet gears 150 is equal to the number of planet pinions 124. In the illustrated embodiment, therefore, three planet gears 150 are provided. Each of the planet gears 150 is fixed to one of the planet pinions 124 for rotation with its associated planet pinion 124. Thus, the gearbox 32 is a "compound" planetary gearbox. When the input hub 120 and the planet carrier 110 rotate, therefore, the rotational force of the input hub 120 is entirely transmitted through the planet pinions 124 to the planet gears 150 to drive the planet gears to rotate about the planet pinion axes.

The planet gears 150 are substantially larger in diameter than the planet pinions 124. Each one of the planet gears 150 has a plurality of external gear teeth 152 which, in the illustrated embodiment, are spur gear teeth. The gearbox 32 also includes a single sun gear 160 mounted within the planet carrier 110, surrounded by the planet pinions 124. The sun gear 160 is radially supported by contact with the surrounding planet gears 150, for rotation of the sun gear 160 relative to the gear box housing 100 about the central axis 112. The sun gear 160 has a hollow bore along its axis, and along the axis of its shaft extension. A hollow tube 162, fixed to the final stage cover 106 on the gearbox housing 100, passes through the bore of the sun gear 160 and its shaft extension, substantially along the axis 112, to conduct control wiring (not shown) through the gear box 32 to the rotor 16. The sun gear 160 rotates relative to, but does not contact, the hollow tube 162. The sun gear 160 is substantially smaller in diameter than the planet gears 150.

The sun gear 160 has a plurality of external spur or helical gear teeth 164 that are in meshing engagement with the external gear teeth 152 on the planet gears 150. As a result, rotation of the planet gears 150 about their axes, in response to rotation of the input hub 120 and the planet pinions 124, causes the sun gear 160 to rotate about the central axis 112. The rotational force of the input hub 120 and the planet carrier 110 is thus entirely transmitted through the planet gears 150 to the sun gear 160, driving the sun gear 160 for rotation about the central axis 112.

The gearbox 32 also includes a final stage 170, including a final stage end plate 172, the final stage cover 106, an output pinion 174, and an optional final stage gear 176. The output pinion 174 may also be referred to herein as the high-speed shaft 174. The final stage gear 176 is rotated with the sun gear 160, about the central axis 112, by a splined connection 178 at the end of the shaft extension of the sun gear 160. The splined end of the shaft extension of the sun gear 160 floats within the clearance in this splined connection to the final stage gear 176. Rotation of the high-speed shaft 174 drives the generator 50 thereby producing electrical energy. The final stage 170 is optional, and many gearboxes use the sun gear 160 as an input to the generator 50.

Input torque from the rotor 16 and the input hub 120 is split among the three planet pinions 124 and thus among the three planet gears 150, for transmission to the sun gear 160. This configuration spreads the high torque provided by the rotating input hub 120 among the planets. However, the sun gear 160 is the one point in the gear train in which all the torque is concentrated.

As shown in FIG. 3, the system 90 also includes various sensing devices that are coupled to the gearbox 32. The sensing devices are configured to collect various information that is related to the health of the gearbox 32. The information collected from the sensors enables personnel to monitor both the health of the gearbox 32 and implement corrective repairs or upgrades based on the information. The sensing devices may include for example, a first tachometer 200 that is installed proximate to the main rotor shaft 42. In operation, the first tachometer 200 is configured to generate a signal that represents the rotational speed of the rotor shaft 42. The system 90 may include a second tachometer 202 that is installed proximate to the high-speed shaft 174. In operation, the second tachometer 202 is configured to generate a signal that represents the rotational speed of the high-speed shaft 174 and also the rotational speed of the generator 50.

The system 90 may include at least one vibration sensor, such as displacement sensor, velocity sensor or accelerometer, that is configured to provide information that represents the vibration of various components in the gearbox 32. Accelerometers are the most commonly used vibration sensors. The sensors may also provide information that indicates vibration, inclination, dynamic distance, or the speed of the various components within the gearbox. For example, the system 90 may include an accelerometer 250 that is mounted proximate to a main shaft bearing 252. The system 90 may also include an accelerometer 254 that is mounted proximate to the ring gear 140. The accelerometer 254 is configured to monitor the meshing between the ring gear 140 and the sun gear 160. The system 90 may further include an accelerometer 256 that is mounted proximate to the high-speed shaft 174, and an accelerometer 258 that is mounted proximate to the final stage gear 176.

In the exemplary embodiment, the outputs from the various sensors described herein are coupled to the controller 30. The controller 30 forms a portion of the exemplary wind turbine gearbox health condition monitoring system 90. The controller 30 includes a computer 300. As used herein, the term "computer" may include any processor or processor-based system including systems using controllers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer". During operation, the computer 300 carries out various functions in accordance with routines stored in an associated memory circuitry 302. The associated memory circuitry 302 may also store configuration parameters, imaging protocols, operational logs, raw and/or processed operational information received from the sensors, and so forth.

The controller 30 may further include interface circuitry 304, also referred to herein as a front end that is configured to receive the inputs from the various sensors described herein. The interface circuitry 304 may include an analog-to-digital converter (not shown) that converts the analog signals received from the sensors to digital signals that may be utilized by the computer 300. The interface circuitry 304 may also include signal conditioning capabilities for operating the various sensors.

The controller 30 may be coupled to a range of external devices via a communications interface. Such devices may include, for example, an operator workstation 306 for interacting with the controller 30. The operator workstation 306 may be embodied as a personal computer (PC) that is positioned near the controller 30 and hard-wired to the controller 30 via a communication link 308. The workstation 306 may also be embodied as a portable computer such as a laptop computer or a hand-held computer that transmits information to the system controller 30. In one embodiment, the communication link 308 may be hardwired between the controller 30 and the workstation 306. Optionally, the communication link 308 may be a wireless communication link that enables information to be transmitted to or from the controller 30 to the workstation 306 wirelessly. In the exemplary embodiment, the workstation 306 is configured to receive information from the controller 30 in real-time operation to enable a remote operator to monitor the performance of the gearbox 32.

The workstation 306 may include a central processing unit (CPU) or computer 310. In operation, the computer 310 executes a set of instructions that are stored in one or more tangible and non-transitory storage elements, e.g. computer readable media, or memories, in order to process input data received from the controller 30. The storage elements may also store data or other information as desired or needed. The storage elements may be in the form of an information source or a physical memory element within the computer 310. The set of instructions may include various commands that instruct the computer 310 to perform various gearbox monitoring functions. For example, the computer 310 may be programmed to receive the various sensor inputs generated by the sensors described above. The computer 310 may be further programmed to compare the sensors inputs to various design parameters stored in the computer 310. Based on the comparison, the computer 310 may generate an output that represents a significant variation, or performance deficiency, between the actual operational characteristics of the gearbox 32 and the expected or operational characteristics as determined based on the design information. Based on the information output from the various sensors, in some embodiments, the controller 30 or computer 310 may automatically stop the operation of the wind turbine 10 when the health or performance information indicates that a component within the gearbox 32 is damaged or may have potential damage.

Described herein are methods and algorithms configured to provide accurate bearing and gear damage feature extraction when the wind turbine is operating under variable speed conditions or operating at a constant speed. Some embodiments described herein utilize the speed information to perform vibration analysis, thus the speed variation effect is reduced or eliminated and the damage features extracted from the shaft speed information are more accurate. In the exemplary embodiment, at least one of the controller 30 or the computer 310 are programmed to implement the methods and algorithms described herein.

Figure 4:
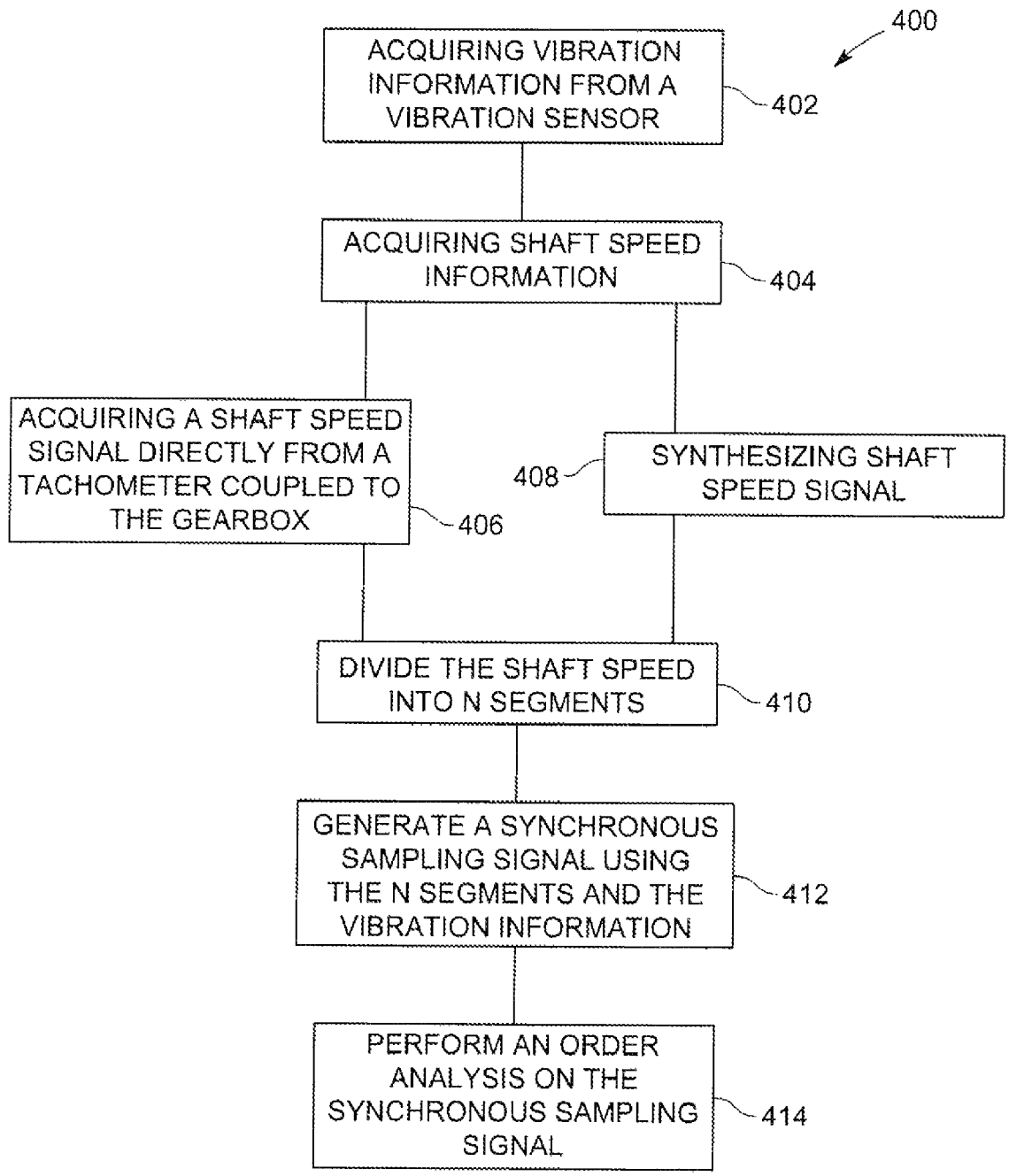
FIG. 4 is a flowchart illustrating an exemplary method of detecting bearing and gear damage in accordance with various embodiments.
Figure 5:
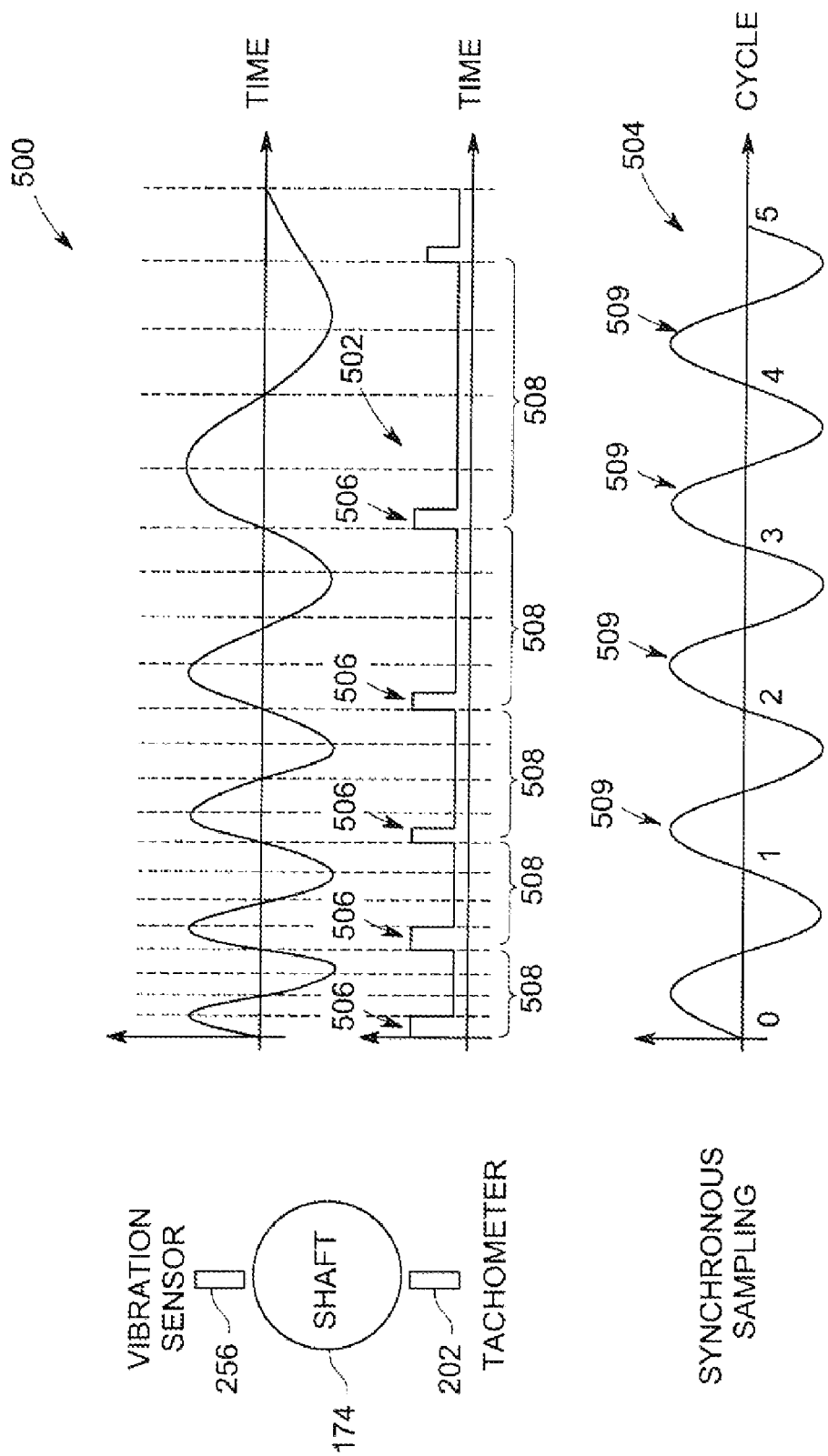
FIG. 5-19 are graphical illustrations of exemplary information that may be generated using the system shown in FIG. 3 in accordance with various embodiments.

FIG. 4 is a flowchart illustrating an exemplary method 400 of detecting potential or actual bearing and gear damage within a wind turbine gearbox while the wind turbine is operating under variable or fixed speed conditions. The method 400 includes acquiring at 402 vibration information from a vibration sensor. The vibration information may be acquired, for example, from the accelerometer 250 that is mounted proximate to the main shaft bearing 252, the accelerometer 254 that is mounted proximate to the ring gear 140, the accelerometer 256 that is mounted proximate to the high-speed shaft 174, and an accelerometer 258 that is mounted proximate to the final stage gear 176. It should be realized that the accelerometers described above are exemplary, and that the vibration information may be acquired from any accelerometer coupled to the gearbox 32. For example, the top portion of FIG. 5 illustrates an exemplary vibration signal 500 that is acquired from the accelerometer 256 that is mounted proximate to the high-speed shaft 174. The X-axis represents time and the Y-axis represents the acceleration output from the accelerometer 256.

The method 400 further includes acquiring at 404 shaft speed information. At 406, the shaft speed information may be acquired directly from a tachometer coupled to the gearbox 32. The shaft speed information may represent the speed of the high-speed shaft 174 acquired directly from the tachometer 202. The shaft speed information may also represent the speed of the main rotor shaft 42 acquired directly from the tachometer 200. It should be realized that the tachometers described above are exemplary, and that the shaft speed information may be acquired from any tachometer coupled to the gearbox 32. For example, the middle portion of FIG. 5 illustrates an exemplary shaft once-per-revolution pulse train signal 502 that is acquired from the tachometer 202 that is mounted proximate to the high-speed shaft 174. The X-axis represents time and the Y-axis represents the voltage output from the tachometer 202.

Referring again to FIG. 4, the method 400 may further include synthesizing at 408 shaft speed information using the controller 30 and/or the computer 310. More specifically, in some embodiments, the exemplary wind turbine may not include a tachometer to provide shaft speed pulse train information from either the high-speed shaft 174 or the main rotor shaft 42. In this embodiment, the shaft speed information is generated or synthesized based on an exemplary shaft speed profile. Optionally, the shaft speed pulse train information may be synthesized using shaft speed profile received from either the tachometer 200, the tachometer 202, or any other means. For example, assuming that the gearbox 32 includes the tachometer 200, but does not include the tachometer 202, the shaft speed of the highs-speed shaft 174 may be synthesized using information received from the tachometer 200 that is mounted proximate to the main rotor shaft 42. Optionally, assuming that the gearbox 32 includes the tachometer 202, but does not include the tachometer 200, the shaft speed of the main rotor shaft 42 may be synthesized using information received from the tachometer 202 that is mounted proximate to the highs-speed shaft 174.

Figure 6:
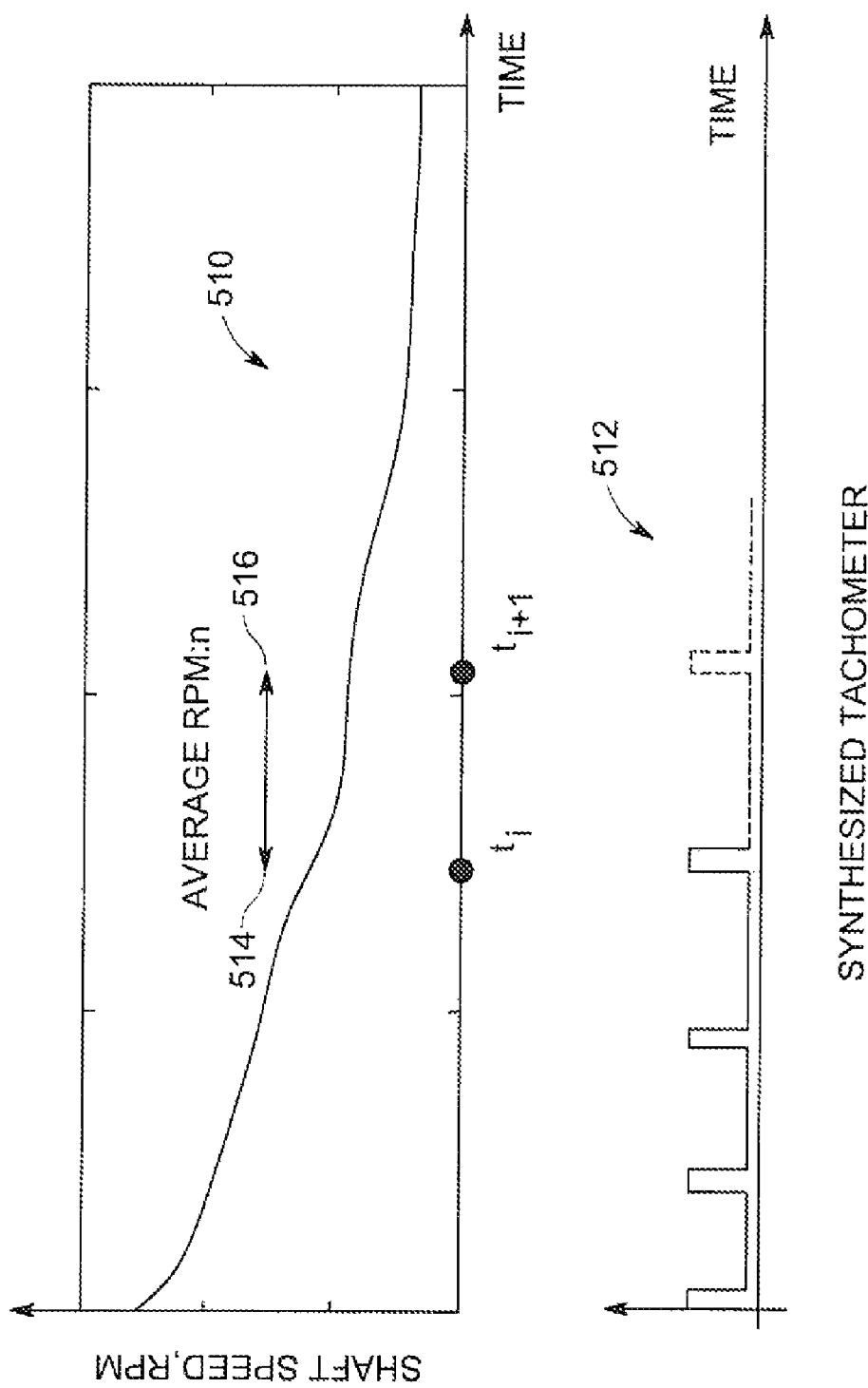

For example, the top portion of FIG. 6 illustrates an exemplary speed profile 510 that may be used for synthesizing a pulse train. The X-axis represents time and the Y-axis represents the actual speed of the high-speed shaft 174 in RPM. In the exemplary embodiment, the speed signal 510 is acquired directly from, for example, the wind turbine operation control system and represents the actual speed of the high-speed shaft 174 while the high-speed shaft 174 is slowing down. It should be realized that a synthesized signal may be generated while the high-speed shaft 174 is operating a fixed speed or is increasing.

In this embodiment, the gearbox 32 may not include the tachometer 200, therefore the speed signal 520 may be used to generate a synthesized speed signal 512, shown in the bottom portion of FIG. 6, that represents the speed of the main rotor shaft 42.

Referring again to the top portion of FIG. 6, to generate the synthesized speed signal 512, a time $t_i$ is initially identified in the speed signal 510. As shown in the top portion of FIG. 6, each time a target (not shown), installed on the high-speed shaft 174, passes the tachometer 202, a pulse 514 is generated. In the exemplary embodiment, FIG. 6 illustrates the pulse 514 is generated at the time $t_i$. Therefore, the method includes identifying the next time the target passes the tachometer 202, e.g. when a subsequent pulse 516 is generated. The second pulse 516 is denoted as occurring at time $t_{i+1}$. Therefore, the time elapsed from $t_i$ to $t_{i+1}$, i.e., $\Delta t_1 = t_{i+1} - t_i$, represents the instantaneous shaft rotation period of the high-speed shaft 174. Moreover, once $t_{i+1}$ is determined, the average speed, n, between $t_i$ and $t_{i+1}$ can be calculated numerically since the speed of the high-speed shaft 174 has been calculated as a function of time. As a result, the shaft instantaneous period of the high-speed shaft 174 may then be approximated by the averaged instantaneous shaft speed, i.e., $\Delta t_2 = 60/n$. By equalizing $\Delta t_1$ and $\Delta t_2$, $t_{i+1}$ may then be calculated for the next pulse location. In the exemplary embodiment, due to time resolution and speed accuracy, an approximation procedure may be used instead of calculating an exact solution to $t_{i+1}$.

In operation, the synthesized synchrophaser representing the shaft speed of the main rotor shaft 42 is more generally determined by first assuming that that a synchrophaser pulse is generated at time 0. Once the $i^{th}$ synchrophaser pulse is located, at time $t_i$, it is assumed that the $(i+1)^{th}$ pulse is located at $t_{i+1}$. The average shaft speed, n, in RPM (Revolutions Per Minute), is then calculated as a function of $t_{i+1}$, from $t_i$ to $t_{i+1}$. In the exemplary embodiment, the average shaft speed of the high-speed shaft 174 may be calculated in accordance with:

$$n(t_{i+1}) = \frac{1}{t_{i+1} - t_i} \int_{t_i}^{t_{i+1}} ShaftSpeed(t)dt. \qquad \text{Equation (1)}$$

The time elapsed from $t_i$ to $t_{i+1}$ is then calculated in accordance with $$\Delta t_1 = t_{i+1} - t_i \qquad \text{Equation (2); and}$$

and the time elapsed by one instantaneous rotation of the high-speed shaft 174 is then calculated in accordance with:

$$\Delta t_2 = 60/n \qquad \text{Equation (3).}$$

In the exemplary embodiment, the location of the second pulse 516, denoted as occurring at time $t_{i+1}$, is solved such that $|\Delta t_1 | \Delta t_2|$ is minimized. Thus, $t_{i+1}$ represents the approximate location of the $(i+1)^{th}$ synchrophaser pulse. The synthesized tachometer signal 512 may then be generated from the synchrophaser, by for example, spacing between the consecutive synchrophaser pulses. In use, the maximum error in the shaft period is $$n(t_{i+1}) = \frac{1}{t_{i+1} - t_i} \int_{t_i}^{t_{i+1}} ShaftSpeed(t)\, dt. \qquad \text{Equation (1)}$$

where T is the sampling period. As a result, for bearing and gear dynamic response analysis, the frequency of interest is generally significantly greater than the shaft speed. In other words, the digitization rate is usually several orders of magnitude higher than the shaft speed. Thus, synthesizing errors from the digitization error are negligibly small.

Referring again to FIG. 4, at 412 a synchronous sampling signal is generated. The synchronous sampling signal may be generated using either shaft speed information acquired directly from a tachometer at 406 shown as signal 502 in the middle portion of FIG. 5. Optionally, the synchronous sampling signal may be generated using the synthesized speed signal generated at 408 shown as signal 512 in FIG. 6.

Referring again to FIG. 5, the bottom portion of FIG. 5 illustrates an exemplary synchronous sampling signal 504 that may be generated using the actual shaft speed signal 502 or the synthesized shaft speed signal 512. In operation, each time a target (not shown), installed on the high-speed shaft 174 or the main rotor shaft 42, passes the tachometer 200 or 202, a pulse 506 is generated. In the exemplary embodiment, the graph illustrates a plurality of pulses 506 and the time between each pulse 506 indicates one whole rotation of either the high-speed shaft 174 or the main rotor shaft 42. Moreover, because the wind turbine 10 operates at varying speeds, the time interval between two pulses is different. Therefore, the method 400 includes modifying at least one of the signal 502 or the signal 512 to generate the synchronous sampling signal 504 such that, for each rotation, there is an equal distance between pulses that is not based on time, but rather is based on the actual rotational position of the shaft.

For example, assuming that the target (not shown) is installed on the high-speed shaft 174 at a single location each time the high-speed shaft 174 rotates through a single rotation, the target passes the tachometer 202 and a pulse 506 is generated. The time between two sequential pulses 506 thus represents a single rotation of the high-speed shaft 174. With the pulse train information known, the conversion from equal time discretization to equal rotation discretization can be achieved with various methods. In the exemplary embodiment, at 410, the signal 502 or 512 is divided into a plurality of segments 508. As shown in the middle portion of FIG. 5, the segments 508 are based, not on the shaft rotational speed or time, but on the rotational position of the high-speed shaft 174. In the exemplary embodiment, each pulse 506 is divided into an equal quantity of N segments 508. The quantity of N segments may be selected by the operator or automatically selected by the controller 30. In the exemplary embodiment, shown in FIG. 5, the signal 502 is divided into 4 segments 508 wherein each segment represents the approximation of a ¼ rotation of the high-speed shaft 174. Specifically, the segments 508 represent the high-speed shaft 174 at positions 0, ¼π, ½π, and ¾π of the shaft circumferential positions. The locations of each segment 508 are illustrated using the dashed lines shown in FIG. 5.

Therefore, after the location of a true pulse 506 has been determined as discussed above, the distance between each pulse 506 may be divided into an equal number of segments 508, where each segment 508 represents a predetermined portion of a single rotation high-speed shaft 174. It should be realized that N=4 segments is exemplary only. In some embodiments, the quantity of segments 508 is greater than N=4. For example, N may be equal to 1024, for example, such that 1024 segments 508 are defined between each pulse 506.

The combination of the signal 500 and the segments 508 are then used to generate the synchronous sampling signal 504 shown in the bottom of FIG. 5. The synchronous sampling signal 504 includes a plurality of cycles 509, wherein each cycle 509 represents a single rotation of the high-speed shaft 174. For example, in the exemplary embodiment shown in the bottom portion of FIG. 5, the synchronous sampling signal 504 includes five cycles 509 wherein each cycle 509 is formed from N segments 508. The quantity N is selected such that there are sufficient segments 508 defined to form the synchronous sampling signal 504. As shown in FIG. 5, between cycle 0 and cycle 1, if each cycle were to be reconstructed using only eight points, e.g. N=4 segments, the four points would be insufficient to generate any higher harmonic signal of the synchronous sampling signal 504. More specifically, to generate a synchronous sampling signal 504 that is capable of illustrating a sine wave having a relatively high frequency, e.g. a frequency that is greater than the high-speed shaft 174 rotational frequency, N may be set at 1024, for example such that 1024 segments or points are used to generate the synchronous sampling signal 504. As discussed above, the synchronous sampling signal 504 represents the rotational cycles of the high-speed shaft 174.

At 414 an order analysis is performed on the synchronous sampling signal 504. More specifically, the synchronous sampling signal 504 represents a cycle domain signal, i.e. a shaft rotation domain signal subdivided into equal circumference or angle domain signal portions. Accordingly, when a Fast Fourier Transform (FFT) is applied to the synchronous sampling signal 504 to perform order domain analysis, an order domain signal is generated.

The method described in FIG. 4 utilizes shaft speed pulse train information acquired from an installed tachometer or synthesized shaft speed pulse train information from a speed profile acquired from either the main rotor shaft 42, the high-speed shaft 174, or any other means, to perform order domain analysis. The order domain analysis enables the system or an operator to identify wear or damage to gearbox components under any operational conditions, e.g. variable speed or torque loading conditions. In operation, the condition monitoring system 90 extracts the gearbox condition features more accurately and utilizes the methods described herein to enhance the feature extraction, and thus provide earlier warnings to an operator monitoring the wind turbine gearbox 32.

Figure 7:
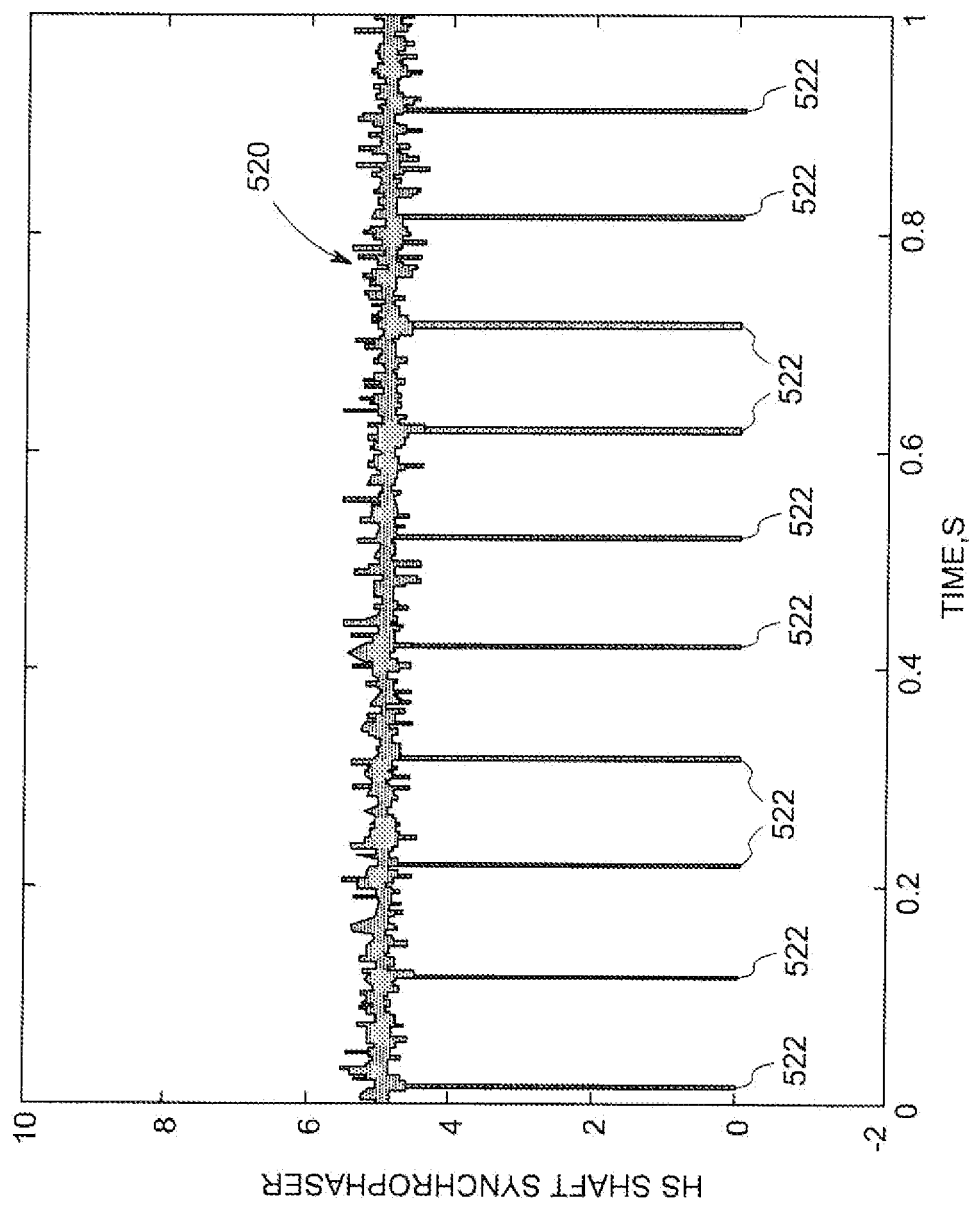

The general operation of the method 400 is explained using the following figures. For example, FIG. 7 is a graphical illustration of exemplary information 520 that may be generated using the tachometer 202 shown in FIG. 3 in accordance with various embodiments. As shown in FIG. 7, each time a target (not shown), installed on the high-speed shaft 174, passes the tachometer 202, a pulse 522 is generated. In the exemplary embodiment, the graph illustrates a plurality of pulses 522 and the time between each pulse indicating one complete rotation of the high-speed shaft 174. In the exemplary embodiment, the raw data received from the tachometer 202 is utilized by the controller 30 to generate the high-speed shaft rotational speed information shown in FIG. 8.

Figure 8:
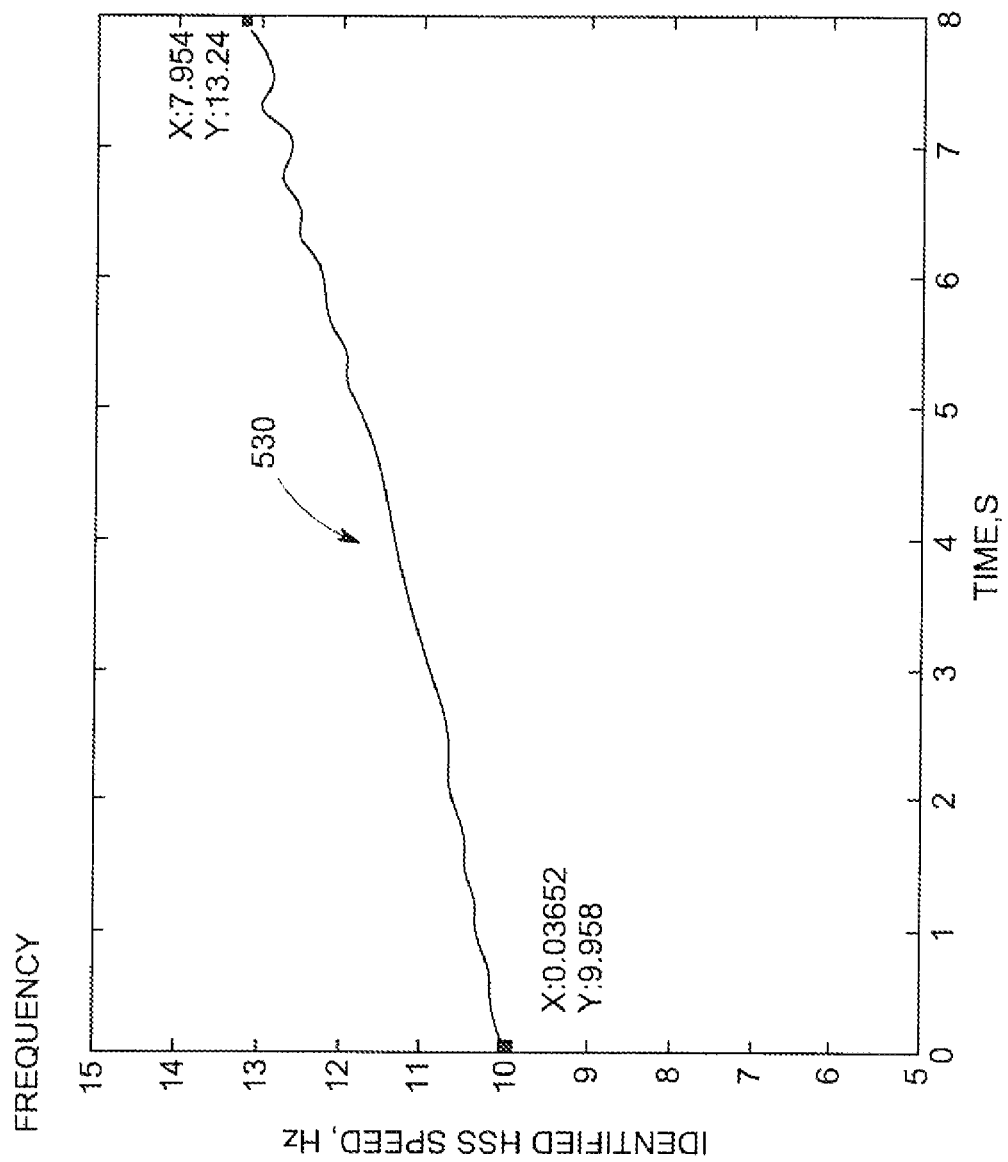

FIG. 8 is a graphical illustration of the raw data shown in FIG. 7 that has been converted to a shaft speed graph 530 using the controller 30. As discussed above, FIG. 7 represents the raw tachometer data received from the tachometer 202 mounted to the high-speed shaft 174. Whereas, FIG. 8 represents actual rotational speed of the shaft 174 over time. In the exemplary embodiment, the raw signal 520 shown in FIG. 7 is converted to the shaft speed graph 530 shown in FIG. 8 using the controller 30. Specifically, FIG. 8 represents the high-speed shaft rotational speed during a speed up process after being digitized by the controller 30. As shown in FIG. 8, as the speed of the wind turbine 10 increases, the rotational speed of the high-speed shaft 174 increases from approximately 9.96 Hz to approximately 13.24 Hz in 8 seconds. As shown in FIG. 8, though the high-speed shaft 174 speed change is relatively small, because the gearmeshing frequency and bearing frequencies are multiples (not necessarily an integer order) of the high-speed shaft 174 speed, the variations at the gearmeshing frequency and bearing frequencies is amplified. Specifically, as shown in FIG. 8, the rotational speed of the high-speed shaft 174 varies based on the wind speed and other factors.

Figure 9:
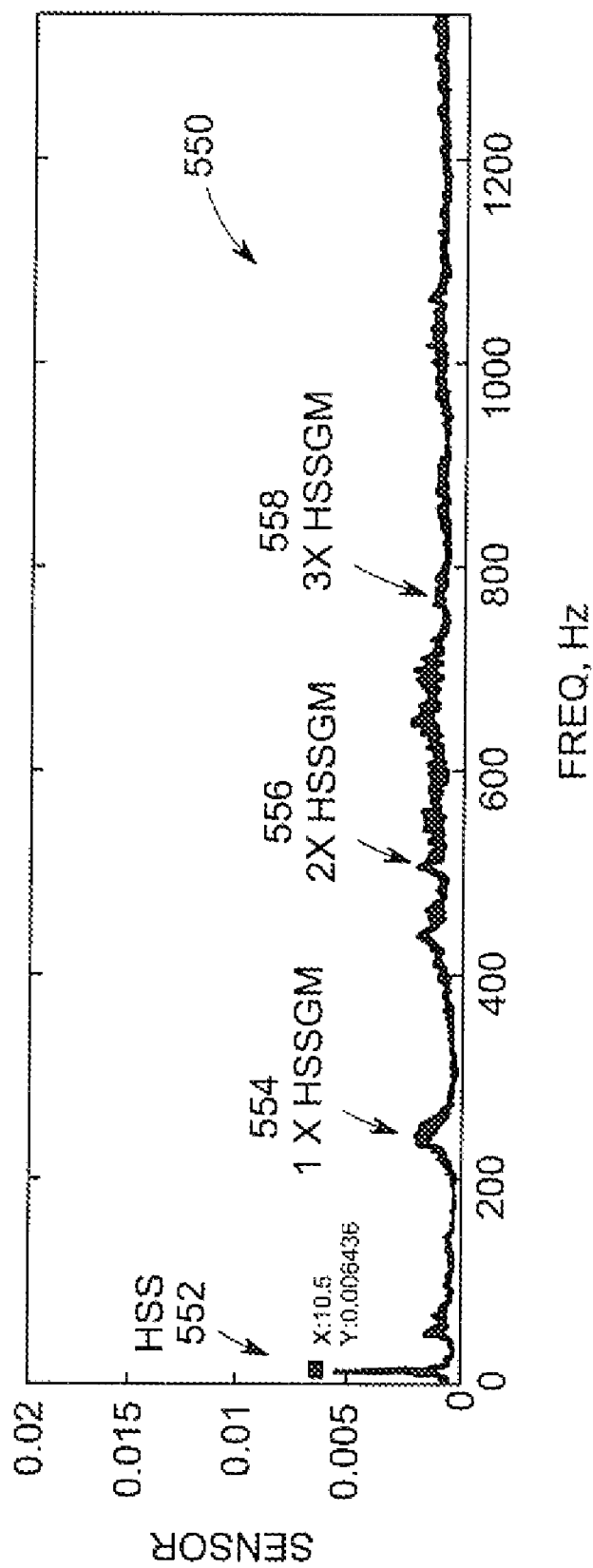

FIG. 9 is a graphical illustration of an exemplary signal 550 generated using information received from the accelerometer 256 that is mounted proximate to the high-speed shaft 174 where the X-axis represents frequency and the Y-axis represents the acceleration output from the accelerometer 256. During operation, as the teeth (not shown) in the gears of the high-speed shaft 174 mesh with the sun gear 160, via the splined connection 178, at least some vibration occurs. This vibration is observed by the accelerometer 256 and transmitted to the controller 30 for processing. In one embodiment, the controller 30 applies a Fast-Fourier Transform (FFT) to the raw data received from the accelerometer 256 to generate the signal 550 shown in FIG. 9. As shown in FIG. 9, a plurality of High Speed Gear-Meshing (HSSGM) locations are represented. For example, HSSGM 552 represents the fundamental gearmeshing frequency extracted from the signal acquired from the accelerometer 256. Whereas, HSSGM 554, HSSGM 556, and HSSGM 558 are high order harmonics of the fundamental HSSGM 502. As shown in FIG. 9, the signal HSS represents the averaged speed of the high-speed shaft 174. During operation, the signal 550 indicates that the high-speed shaft frequency is approximately 10.5 Hz under the frequency resolution of 0.5 Hz. Moreover, the blurring around the points is caused by the speed variation of the highs-speed shaft 174.

In order to improve the ability to clearly identify the high order harmonics shown in FIG. 9, an order analysis is performed on the accelerometer information. As discussed above, the order analysis is performed in the cycle domain not the time domain. As discussed above, due to the speed variations of the wind turbine 10, the FFT based conventional analysis method may not adequately enable an operator to identify this gearmeshing frequency and amplitude, which contains gear tooth health conditions, noted as blurring in FIG. 9. This deficiency is further amplified in higher frequencies. For example, it is difficult to distinguish the second harmonic of the HSSGM 554, the third harmonic of the HSSGM 556 and the fourth harmonic of HSSGM 558.

Figure 10:
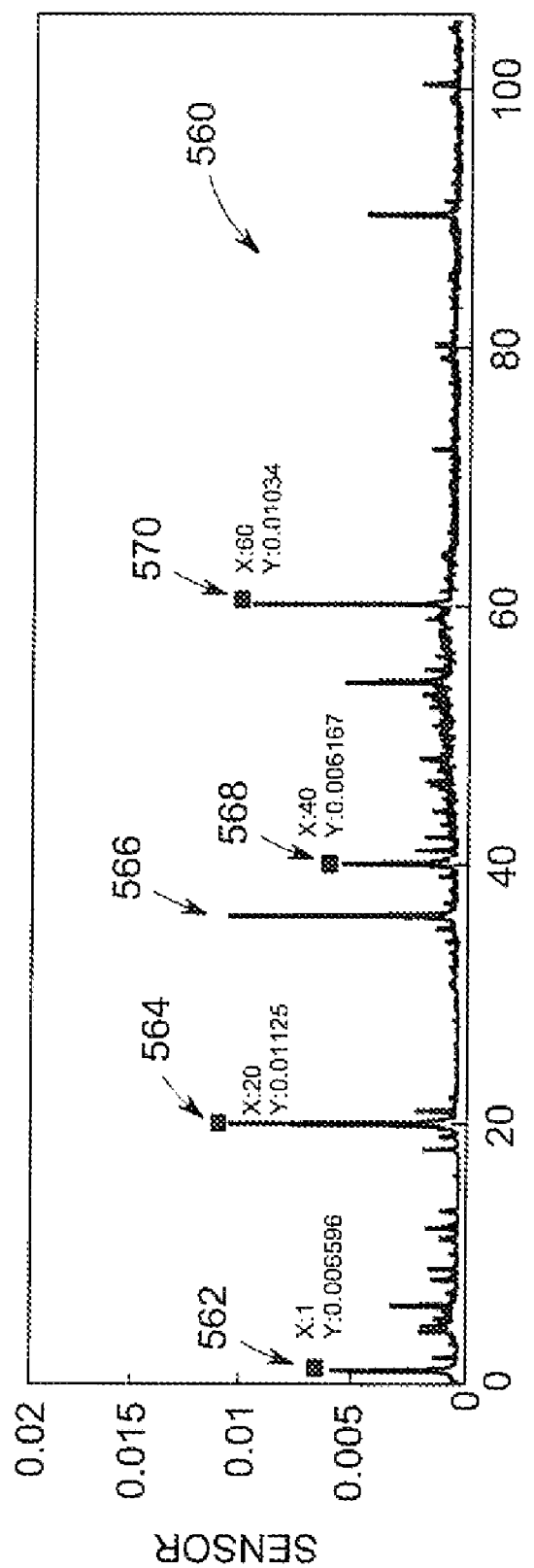

FIG. 10 is a graphical illustration of exemplary signal processing results 560 generated using the same information received from the accelerometer 256 as is used to generate the line 550 shown in FIG. 9 using the order analysis method described herein. As shown in FIG. 10, the X-axis represents order domain of the signal 550 shown in FIG. 9 and the Y-axis represents the acceleration (in g) output from the accelerometer 256. More specifically, the signals that are blurred humps in the frequency domain shown in FIG. 9, appear as distinguished peaks 562-570 in the order domain shown in FIG. 10. In the exemplary embodiment, point 562 represents the rotational speed of the high-speed shaft 174. Moreover, point 564 corresponds to the gearmeshing order, while points 566, 568, and 570, etc., represent higher orders of the gearmeshing order 564.

In this example, the high-speed shaft 174 has twenty teeth, thus the high-speed gearmeshing order 564 is 20, which means 20 times meshing occurred in one revolution of the high-speed shaft. In the exemplary embodiment, the controller 30 applies the order analysis method to the raw data received from the accelerometer 256 to generate the line 560 shown in FIG. 10. Using order analysis, the sidebands around each point 564, 566, 568, 570, etc. are also easily distinguished enabling an operator or design engineer to identify the sidebands around each peak, which may contain the gear teeth health information. This information may then be utilized by the operator to monitor the health condition of the gearbox 32.

As shown in FIG. 10, the variation due to the shaft speed change has been eliminated. Because the order analysis shown in FIG. 10 is based on the high-speed shaft 174, the order of the high-speed shaft 174 is exactly at 1 and the high-speed gearmeshing fundamental order is at 20 in this exemplary configuration. Furthermore, the higher orders of the high-speed gearmeshing frequencies are also clearly identifiable. In one embodiment, an operator may identify gearbox damage by visually inspecting the results shown in FIG. 10. Optionally, the system 90 may be configured to automatically identify and present potential damage results to an operator. The system 90 may be programmed to receive a predetermined index number. The index number representing an index space about each point identified in FIG. 10, for example. The index space may be a percentage of change in a sideband frequency around each point. For example, if the system 90 determines that there is a sideband frequency that is approximately 20% of total energy, the system 90 may generate a visual or audio indication that a potential component failure has occurred or may occur in the near future. The visual or audio indication may also indicate the spread of potential damage in the gearbox 32.

Figure 11:
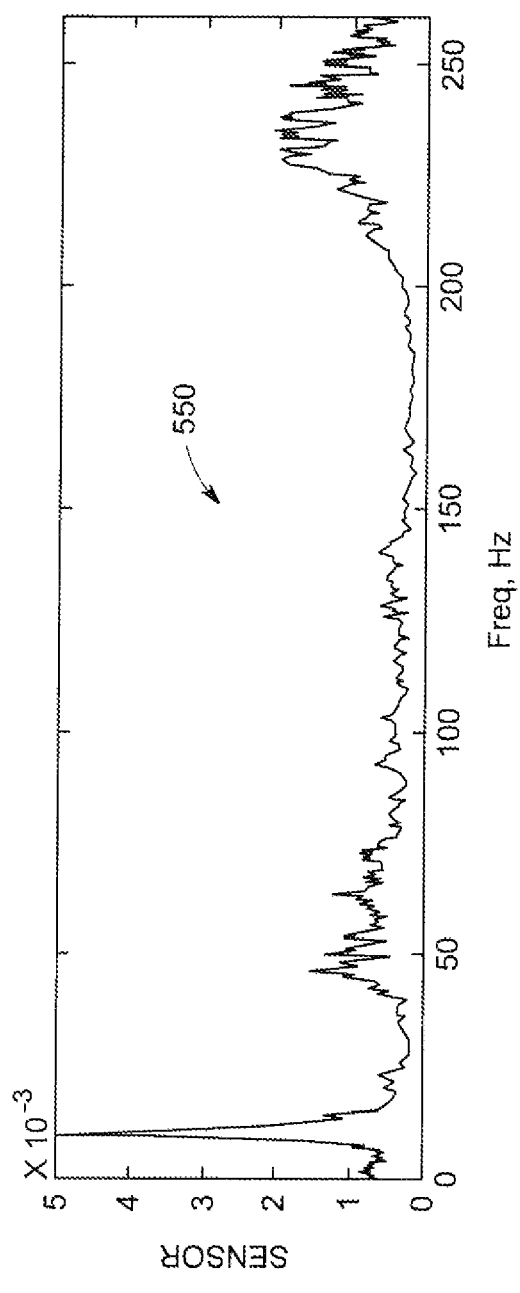
Figure 12:
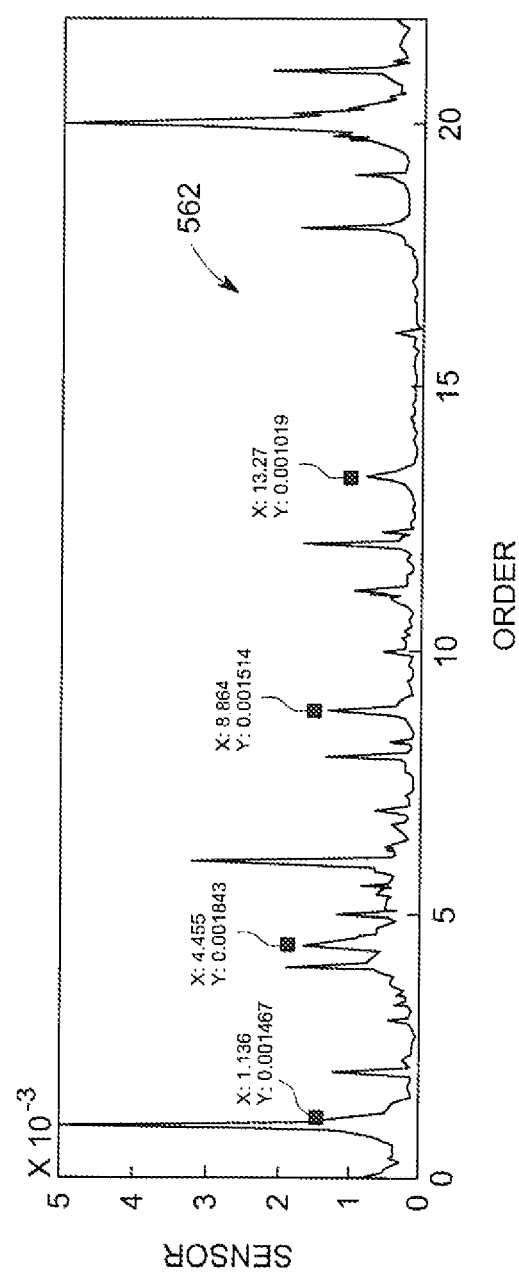

FIG. 11 is a zoomed version of the signal 550 shown in FIG. 9. FIG. 12 is a zoomed version of the signal 560 shown in FIG. 10. As shown in FIG. 11, the conventional power spectrum of the signal 550 produces blurring or distortion around 240 Hz which represents the high-speed gear meshing frequency. Moreover, there is also blurring or distortion around 50 Hz and 70 Hz. However, when the accelerometer information is processed with order analysis as discussed above to generate the signal 560, the order spectrum of the high-speed shaft gear meshing frequency is more clean and identifiable. For example, in addition to the high-speed shaft frequency and higher order frequency harmonics, peaks at 4.46 and 8.84, other orders are clearly shown as marked in FIG. 12. For example, the second stage gearmeshing order (4.4347 order) and second harmonics (8.8694 order) and third harmonics (13.3041 order) are also clearly identifiable. Additionally, the first stage gearmeshing (1.1087 order) is also identifiable, but is small and close to the shaft speed.

In operation, the order analysis methods described herein may be used to improve the identification of damage or potential damage, when the wind turbine 10 is operating at a variable speed or a fixed speed. More specifically, because many bearing and gear features are high orders of the shaft frequency, any slight variation in the shaft speed will influence the power spectrum amplitude at the gearing and bearing condition feature frequency locations. As a result, those feature frequencies are not always at the frequency bins of the power spectrum. Thus, the amplitude of the gear and bearing condition features may vary in the power spectrum. However, using the order analysis methods described herein, the sampling points within a shaft cycle are fixed, thus the sampling point within a feature frequency cycle is also a fixed number, as a result, the feature amplitude is fixed as well.

Figure 13:
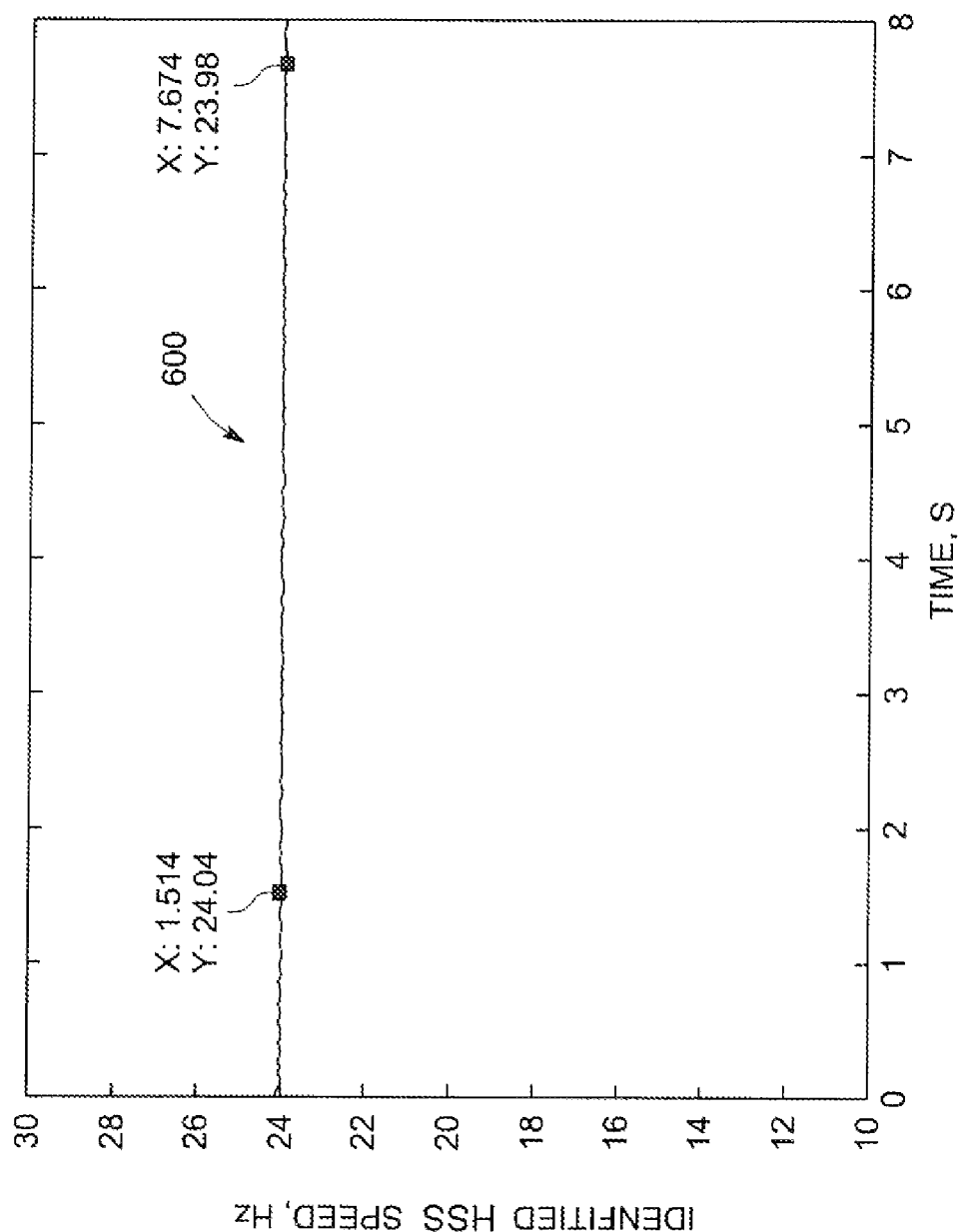

For example, FIG. 13 is a graphical illustration of an exemplary speed signal 600 acquired from the tachometer 202 when the high-speed shaft 174 is operating at an approximately constant speed. The X-axis represents time and the Y-axis represents the frequency of the shaft speed. As shown in FIG. 13, the high-speed shaft 174 is controlled at a constant speed of approximately 24 Hz or 1440 RPM. The speed variation is less than approximately 0.06 Hz, or 3.6 RPM.

Figure 14:
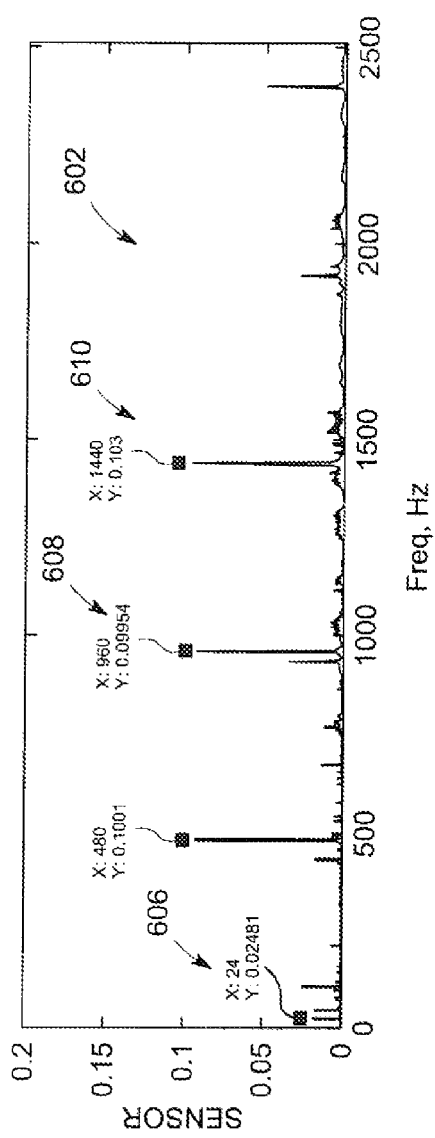
Figure 15:
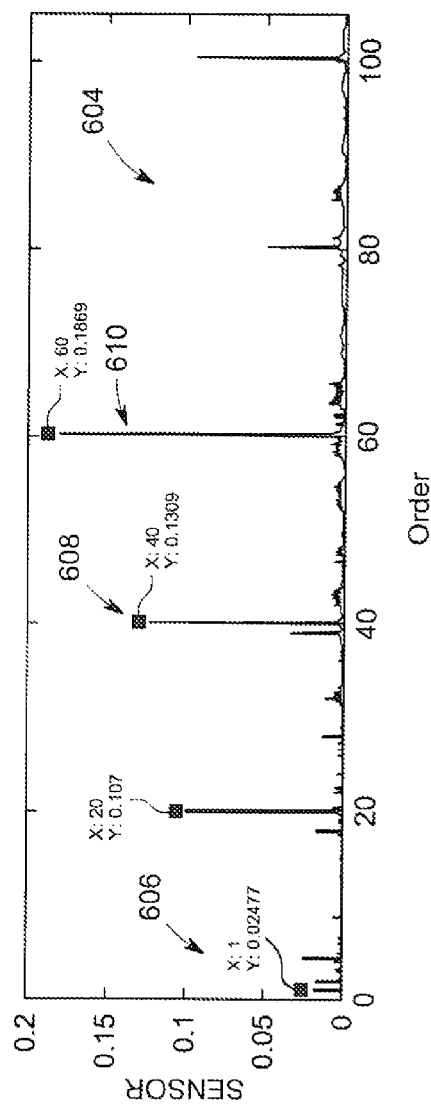

FIG. 14 is a graphical illustration of an exemplary power spectrum 602 generated using the signal 600 shown in FIG. 13. FIG. 15 is a graphical illustration of an exemplary order spectrum 604 generated using the signal 600 shown in FIG. 13. By comparing the magnitudes of the marked peaks of the power spectrum 600 shown in FIG. 14 with the order spectrum 604 shown in FIG. 15, the operator may observe that the magnitude of the power spectrum 604, at 24 Hz, is very close to the corresponding magnitude from the order spectrum 604 for a first order harmonic 606. This is as expected because the speed variation at the shaft speed is very small. Moreover, the distortion in the power spectrum 606 at this frequency is relatively small because there is a 0.5 Hz frequency resolution, which results in a frequency bin at 24 Hz.

However, at high-speed gear meshing frequencies and high order harmonics, the amplitude difference becomes significant, especially at the higher orders. For example, at the $3^{rd}$ harmonics 608 of the high-speed gearmeshing, the power spectrum magnitude is approximately 45% lower than the order spectrum magnitude (true amplitude). This difference between the power spectrum harmonics and the order spectrum harmonics indicates that vibration energy did smear in the power spectrum 602 shown in FIG. 14, while in the order spectrum 604, the signal energy is tightly located at the specified order (60 order in this case) as expected from the results of the synchronous sampling technique described above.

Figure 16:
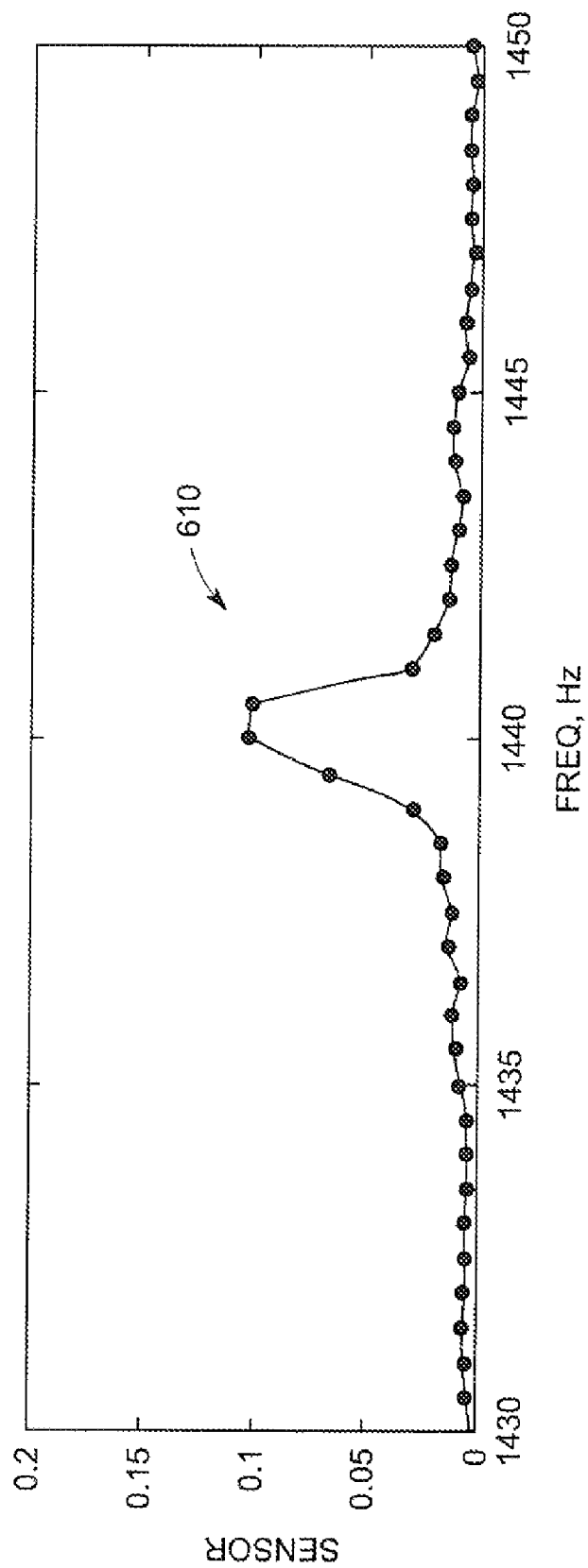
Figure 17:
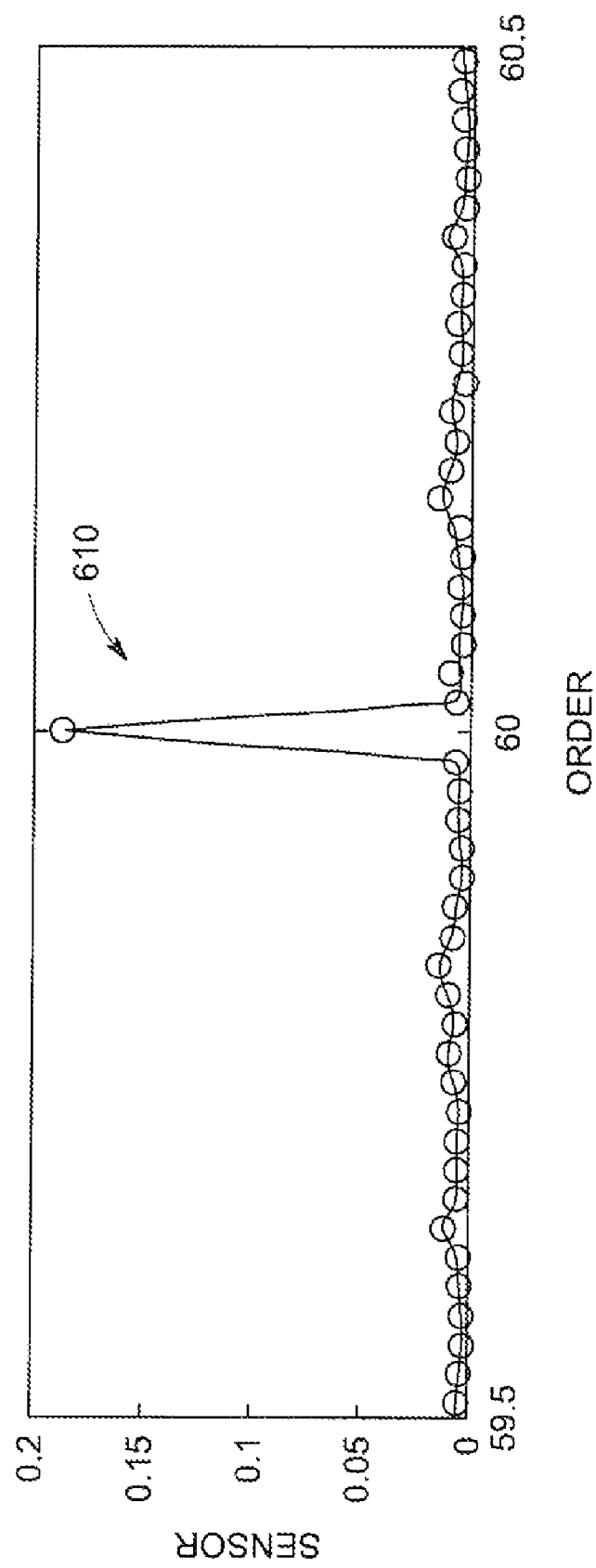

FIG. 16 is a detailed graphical illustration of exemplary results obtained using the conventional power spectrum analysis shown in FIG. 14. FIG. 17 is a detailed graphical illustration of the exemplary results obtained using the order analysis method shown in FIG. 15. As shown in FIG. 16, the harmonics indicate that the vibration energy is smeared around a point 610 at approximately 1440 Hz in the power spectrum using the conventional power spectrum analysis. While FIG. 17 illustrates that the signal energy at point 610 is tightly located at the specified order using the synchronous sampling method described herein.

Figure 18:
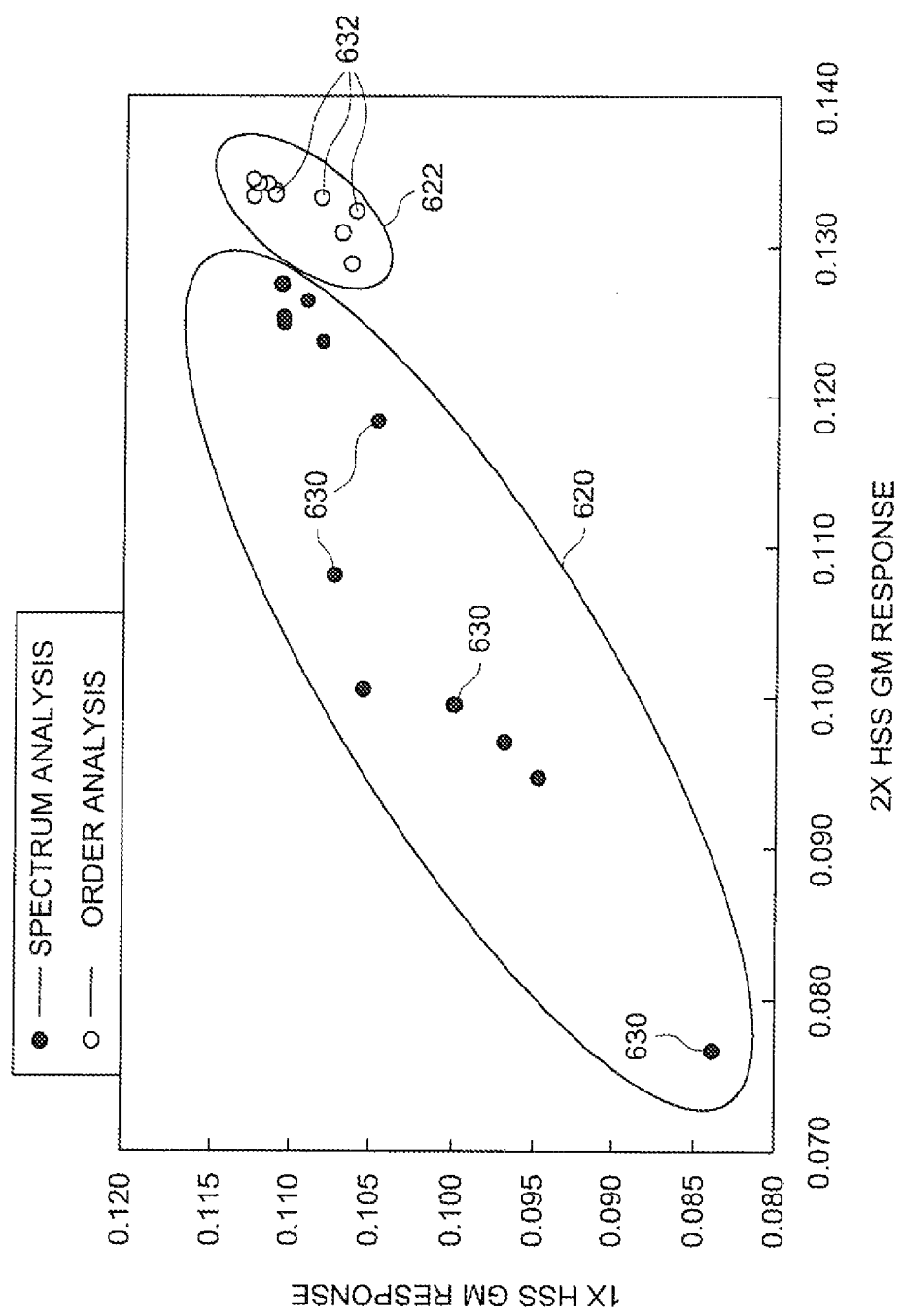
Figure 19:
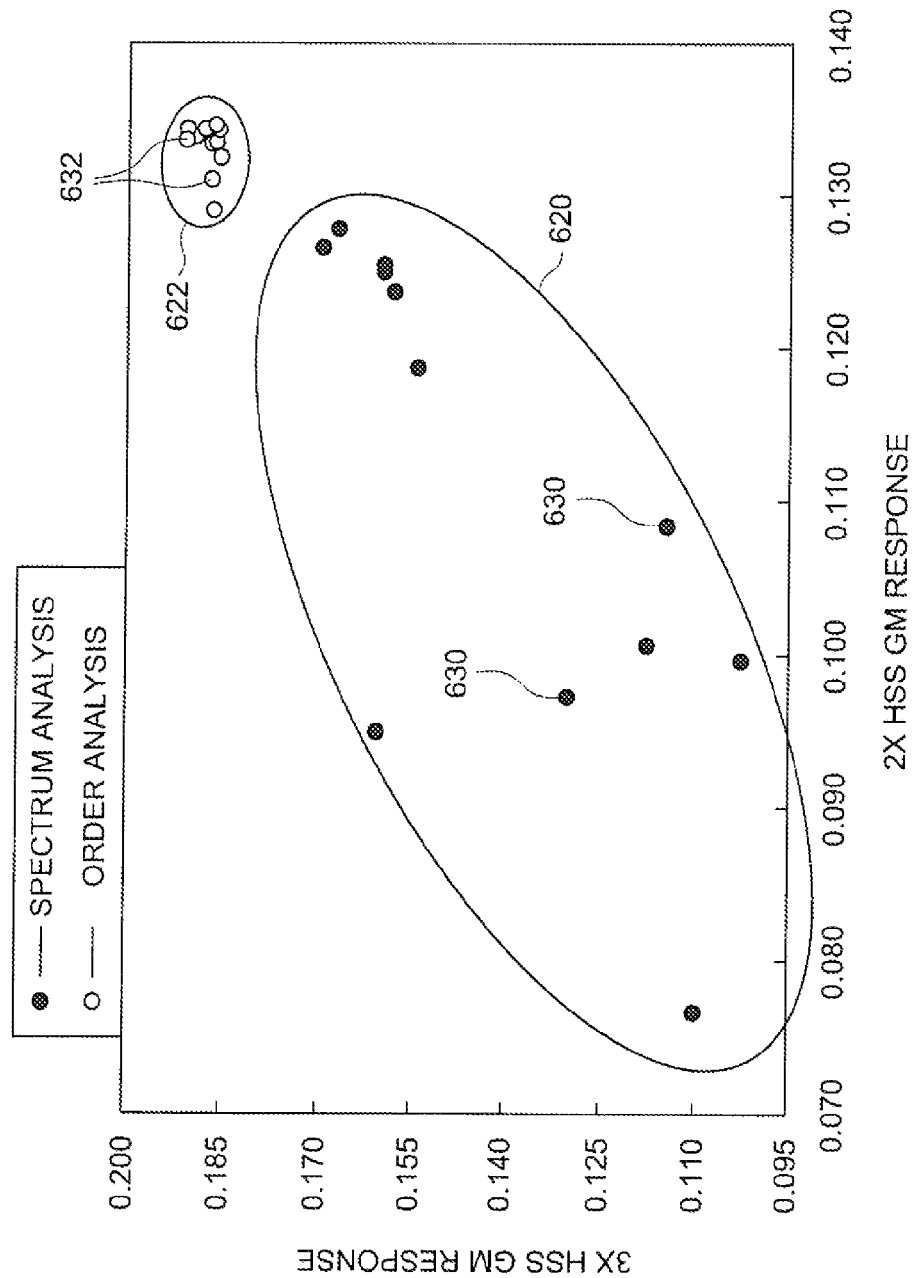

To better visualize the difference of the results obtained using the conventional power spectrum analysis and the order analysis described herein, reference is now made to FIGS. 18 and 19. FIG. 18 is a graphical illustration of vibration analysis results 620 for twelve constant speed cases obtained using power spectrum analysis. FIG. 18 also illustrates vibration analysis results 622 for twelve constant speed cases obtained using the order analysis method described herein. It should be realized that both the power spectra and order spectra were analyzed using information acquired from the same accelerometer on gearbox 32. For each result, amplitudes of the high-speed gear meshing response (1×HSS GM) and its $2^{nd}$ and $3^{rd}$ harmonics (2×HSS GM and 3×HSS GM) were extracted. The distribution of the 1×HSS GM versus 2×HSS GM amplitude from power spectrum and order spectrum are each shown in FIG. 18, where the vertical axis is the 1×HSS GM amplitude and the horizontal axis is the 2×HSS GM amplitude. As shown in FIG. 18, the solid dots 630 are the amplitudes extracted from the power spectrum while the circles 632 are the amplitudes extracted using the order spectrum. As shown in FIG. 18, the amplitudes extracted from the order analysis are generally higher and more tightly clustered than those extracted from the conventional power spectrum. This result is made more apparent in higher frequency regions, such as those shown in FIG. 19, where the distributions of 2×HSS GM versus 3×HSS GM are plotted.

A technical effect of the various embodiments is to provide a system that is configured to monitor both the performance of a wind turbine gearbox and also to determine the health of the wind turbine gearbox. The system includes various sensors that are coupled to the gearbox. The outputs from the various sensors are input to a controller. Information obtained from various sensors installed in the gearbox may be transmitted to the controller via a wired or wireless connection. Digitized sensor signals are then processed by the controller to extract bearing component health conditions and to assess gearbox performance. The information may also be transmitted to gearbox providers and engineers through a wired or wireless communication devices. Additionally, operators and designers may request actions needed through the communication device and the controller.

Specifically, the methods and system described herein improve the efficiency and the accuracy of condition monitoring by utilizing an order spectrum analysis. Various embodiments described herein utilize either an actual tachometer signal or a synthesized tachometer signal. The tachometer signal is divided into segments based on the rotational position of the shaft to generate a synchronous sampling signal. The synchronous sampling signal is formed such that for each rotation there is an equal distance that is not based on time, but is a position of the shaft during rotation. An FFT is then applied to the cycle based synchronous sampling signal to generate a graphical illustration of actual or potential gearbox damage.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. For example, the ordering of steps recited in a method need not be performed in a particular order unless explicitly stated or implicitly required (e.g., one step requires the results or a product of a previous step to be available). While the dimensions and types of materials described herein are intended to define the parameters of the invention, they are by no means limiting and are exemplary embodiments. Many other embodiments will be apparent to those of skill in the art upon reviewing and understanding the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose various embodiments of the invention, including the best mode, and also to enable any person skilled in the art to practice the various embodiments, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A wind turbine gearbox monitoring system, comprising:
a plurality of sensors coupled to a wind turbine gearbox outputting at least one of vibration information and shaft speed information; and
a controller coupled to the plurality of sensors and configured to output operating information identifying potential and actual damage within the wind turbine gearbox based on the vibration information and the shaft speed information, the controller converting the shaft speed information and the vibration information into a cycle domain signal, and performing an order analysis on the cycle domain signal, the order analysis providing information that identifies potential and actual damage within the wind turbine gearbox, wherein to convert the equal time vibration information into an equal circumferential position cycle domain signal using a tachometer pulse train signal, the controller is further programmed to divide the tachometer signal into a plurality of segments, each segment representing a different rotational position of a gearbox shaft.

2. The monitoring system in accordance with claim 1, wherein the shaft speed information is acquired directly from a tachometer installed on the wind turbine gearbox.

3. The monitoring system in accordance with claim 1, wherein the shaft speed information comprises synthetic low-speed shaft information that is synthesized using shaft speed profile information acquired from a high-speed shaft.

4. The monitoring system in accordance with claim 1, wherein the tachometer signal comprises a synthetic high-speed shaft tachometer signal that is synthesized using shaft speed information acquired from a low-speed shaft.

5. The monitoring system in accordance with claim 1, wherein the tachometer signal comprises a low-speed shaft tachometer signal that is synthesized using shaft speed information acquired from a high-speed shaft.

6. The monitoring system in accordance with claim 1, wherein to perform the order analysis, the controller is further programmed to apply a Fast Fourier Transform (FFT) to the converted cycle domain signal.

7. The monitoring system in accordance with claim 1, wherein the controller is further programmed to convert a shaft speed profile of a first shaft to generate a synthetic tachometer signal representing the rotational speed of a second different shaft.

8. The monitoring system in accordance with claim 1, wherein the tachometer signal comprises a synthetic low-speed shaft tachometer signal, the controller configured to convert a high-speed tachometer signal into a high-speed shaft speed profile, convert the high-speed shaft speed profile into a low-speed shaft profile, and convert the low-speed shaft profile into the low-speed tachometer signal.

9. A wind turbine comprising:
a rotor including a plurality of blades;
a gearbox coupled to the rotor;
a generator coupled to the gearbox;
a plurality of sensors coupled to the gearbox outputting at least one of vibration information and shaft speed information; and
a controller coupled to the plurality of sensors and configured to output operating information identifying potential and actual damage within the wind turbine gearbox based on the vibration information and the shaft speed information, the controller converting the shaft speed information and the vibration information into a cycle domain signal, and performing an order analysis on the cycle domain signal, the order analysis providing information that identifies potential and actual damage within the wind turbine gearbox, wherein to convert the tachometer signal and the vibration information into a cycle domain final, the controller is further programmed to divide the tachometer signal into a plurality of segments, each segment representing a different rotational position of a gearbox shaft.

10. The wind turbine in accordance with claim 9, wherein the shaft speed information is acquired directly from a tachometer installed on the wind turbine gearbox.

11. The wind turbine in accordance with claim 9, wherein the shaft speed information comprises a synthetic low-speed shaft tachometer signal that is synthesized using shaft speed information acquired from a high-speed shaft.

12. The wind turbine in accordance with claim 9, wherein the tachometer signal comprises a synthetic high-speed shaft tachometer signal that is synthesized using shaft speed information acquired from a low-speed shaft.

13. The wind turbine in accordance with claim 9, wherein to perform the order analysis, the controller is further programmed to apply a Fast Fourier Transform (FFT) to the cycle domain signal.

14. The wind turbine in accordance with claim 9, wherein the controller is further programmed to convert a shaft speed profile of a first shaft to generate a synthetic tachometer signal representing the rotational speed of a second different shaft.

15. A method of monitoring the health of a wind turbine gearbox, said method comprising:
acquiring vibration information from a vibration sensor coupled to a wind turbine gearbox;
acquiring a tachometer signal;
converting the tachometer signal and the vibration information into a cycle domain signal using a processor; and
performing, using the processor, an order analysis on the cycle domain signal, the order analysis enabling an operator to identify potential damage within the wind turbine gearbox, wherein converting further comprises dividing the tachometer signal into a plurality of segments, each segment representing a different rotational position of a gearbox shaft.

16. The method in accordance with claim 15 wherein acquiring a tachometer signal further comprises synthesizing a synthetic low-speed shaft tachometer signal using shaft speed information acquired from a high-speed shaft.

17. The method in accordance with claim 15 wherein acquiring a tachometer signal further comprises applying a Fast Fourier Transform (FFT) to the cycle domain signal.

* * * * *

UNITED STATES PATENT AND TRADEMARK OFFICE
CERTIFICATE OF CORRECTION

PATENT NO. : 8,364,424 B2  
APPLICATION NO. : 12/847331  
DATED : January 29, 2013  
INVENTOR(S) : Luo et al.

It is certified that error appears in the above-identified patent and that said Letters Patent is hereby corrected as shown below:

On the Title Page, in Field (12), under "United States Patent", in Column 1, Line 1, delete "Lou" and insert -- Luo --, therefor.

On the Title Page, in Field (75), under "Inventors", in Column 1, Line 1, delete "Lou," and insert -- Luo, --, therefor.

In Columns 8 & 9, Lines 67 & 2-6, delete " period is $n(t_{i+1}) = \frac{1}{t_{i+1} - t_i} \int_{t_i}^{t_{i+1}} ShaftSpeed(t)\,dt.$   Equation (1)   where " and insert -- period is $\frac{T}{2}$, where --, therefor.

In Column 16, Line 17, in Claim 9, delete "final," and insert -- signal, --, therefor.

Signed and Sealed this  
Ninth Day of April, 2013

Teresa Stanek Rea  
*Acting Director of the United States Patent and Trademark Office*